United States Patent
Knigge et al.

(10) Patent No.: US 7,903,375 B2
(45) Date of Patent: Mar. 8, 2011

(54) PROXIMITY RECORDING SLIDER WITH HIGH AIR BEARING DAMPING IN AND OUT OF CONTACT

(75) Inventors: Bernhard E. Knigge, San Jose, CA (US); Robert N. Payne, San Jose, CA (US); Oscar J. Ruiz, San Jose, CA (US)

(73) Assignee: Hitachi Global Storage Technologies, Netherlands, B.V., Amersterdam (NL)

( * ) Notice: Subject to any disclaimer, the term of this patent is extended or adjusted under 35 U.S.C. 154(b) by 357 days.

(21) Appl. No.: 11/403,177

(22) Filed: Apr. 11, 2006

(65) Prior Publication Data

US 2007/0236838 A1 Oct. 11, 2007

(51) Int. Cl.
*G11B 5/60* (2006.01)
(52) U.S. Cl. .............. 360/235.7; 360/235.8; 360/236.3; 360/236.5; 360/237
(58) Field of Classification Search ........... 360/236.5, 360/235.7, 235.8, 236.3, 236.6, 237
See application file for complete search history.

(56) References Cited

U.S. PATENT DOCUMENTS

| | | | |
|---|---|---|---|
| 5,831,792 A | 11/1998 | Ananth | |
| 5,940,249 A | 8/1999 | Hendriks | |
| 6,055,128 A * | 4/2000 | Dorius et al. | 360/235.8 |
| 6,188,547 B1 * | 2/2001 | Gui et al. | 360/236.5 |
| 6,229,671 B1 * | 5/2001 | Boutaghou et al. | 360/235.1 |
| 6,233,118 B1 | 5/2001 | Boutaghou et al. | |
| 6,396,663 B1 | 5/2002 | Kasamatsu | |
| 6,424,494 B1 * | 7/2002 | Koishi | 360/235.6 |
| 6,462,909 B1 | 10/2002 | Boutaghou et al. | |
| 6,466,410 B2 * | 10/2002 | Polycarpou et al. | 360/236.6 |
| 6,510,027 B1 | 1/2003 | Chapin et al. | |
| 6,556,381 B2 | 4/2003 | Kohira et al. | |
| 6,560,071 B2 | 5/2003 | Chapin et al. | |
| 6,603,639 B1 | 8/2003 | Polycarpou et al. | |
| 6,633,455 B2 | 10/2003 | Tokisue et al. | |
| 6,661,611 B1 | 12/2003 | Sannino et al. | |
| 6,683,755 B2 * | 1/2004 | Koishi | 360/235.6 |
| 6,697,223 B2 | 2/2004 | Lewis et al. | |
| 6,809,904 B2 * | 10/2004 | Boutaghou et al. | 360/235.8 |
| 7,339,766 B2 * | 3/2008 | Yao et al. | 360/236.3 |
| 2002/0063995 A1 * | 5/2002 | Sannino et al. | 360/236.3 |
| 2002/0089790 A1 * | 7/2002 | Stoebe et al. | 360/236.3 |
| 2004/0052001 A1 | 3/2004 | Crone et al. | |
| 2004/0066581 A1 * | 4/2004 | Kameyama | 360/236.2 |
| 2004/0150916 A1 * | 8/2004 | Rao et al. | 360/235.8 |
| 2005/0185342 A1 * | 8/2005 | Tani | 360/235.6 |
| 2006/0092570 A1 * | 5/2006 | Payne et al. | 360/236.5 |
| 2007/0019329 A1 * | 1/2007 | Yao et al. | 360/236.3 |
| 2007/0058296 A1 * | 3/2007 | Hashimoto et al. | 360/234.3 |
| 2007/0230050 A1 * | 10/2007 | Ruiz | 360/128 |

OTHER PUBLICATIONS

Tagawa, Norio, et al., "Air Film Dynamics for Micro-Textured Flying Head Slider Bearings in Magnetic Hard Disk Drives", *Journal of Tribology*, vol. 124, (Jul. 2002),568-574.

Xu, J., et al., "Ultra-Low-flying-height design from the viewpoint of contact vibration", *Tribology International 36*, (2003),459-466.

* cited by examiner

*Primary Examiner* — Jefferson Evans

(57) ABSTRACT

An air bearing surface for a head assembly for a data storage device comprises at least one air bearing pad. At least one channel is recessed within the at least one air bearing pad. The at least one channel is formed with an open top and is located entirely within boundaries of the at least one air bearing pad.

18 Claims, 21 Drawing Sheets

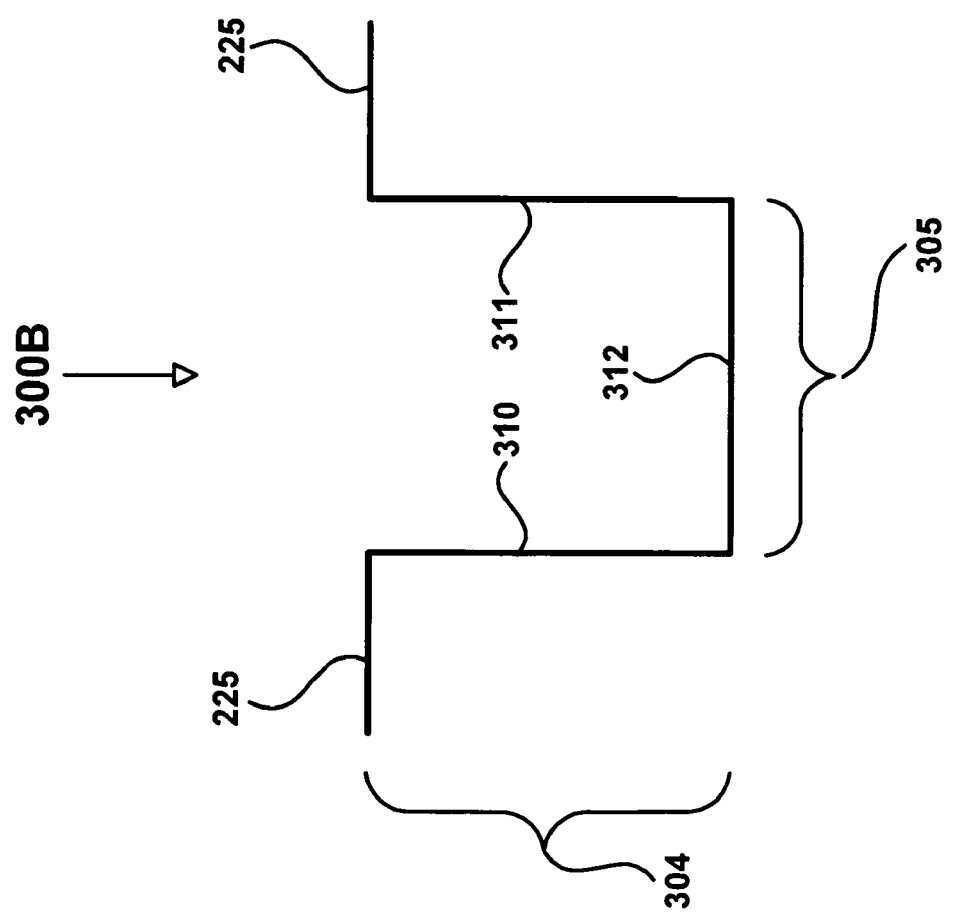

PROXIMITY RECORDING SLIDER WITH HIGH AIR BEARING DAMPING IN AND OUT OF CONTACT

TECHNICAL FIELD

The present invention relates generally to head assemblies used in data storage devices, and more particularly to the air bearing surface on the slider affixed to the transducer suspension system.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable.

The basic hard disk drive model includes a storage disk or hard disk that spins at a designed rotational speed. An actuator arm is utilized to reach out over the disk. The arm carries a head assembly that has a magnetic read/write transducer or head for reading/writing information to or from a location on the disk. The transducer is attached to a slider, such as an air-bearing slider, which is supported adjacent to the data surface of the disk by a cushion of air generated by the rotating disk. The transducer can also be attached to a contact-recording type slider. In either case, the slider is connected to the actuator arm by means of a suspension. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

This continual reduction in size has placed steadily increasing demands on the technology used in the HGA, particularly in terms of power consumption, shock performance, and disk real estate utilization. One recent advance in technology has been the development of the Femto slider, which is roughly one-third of the size and mass of the older Pico slider, which it replaces; over the past 23 years, slider size has been reduced by a factor of five, and mass by a factor of nearly 100.

These smaller sliders have substantially smaller surface areas, which increases the difficulties associated with achieving and maintaining a suitable fly height. Additionally, several of the applications for Femto sliders call for smaller disks, to better fit in portable electronic devices, and lower rotational speeds, to better conserve power. Moreover, with reduced flying heights, contact between the slider and disk surface becomes unavoidable. Coupled with concerns for slider damping in and out of contact with the disk surface, it has proven very difficult to find an appropriate design for the air bearing surface that meets the needs imposed by current demand.

SUMMARY OF THE INVENTION

An air bearing surface for a head assembly for a data storage device comprises at least one air bearing pad. At least one channel is recessed within the at least one air bearing pad. The at least one channel is formed with an open top and is located entirely within boundaries of the at least one air bearing pad.

BRIEF DESCRIPTION OF THE DRAWINGS

FIG. 3B is a cross-sectional view of an exemplary channel, in accordance with one embodiment of the present invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected therewith. The discussion will then focus on a physical description of an air bearing surface of a proximity recording slider with high air bearing damping. Discussion will then turn to physical descriptions of embodiments of recessed channels and raised ridges which can be configured onto an air bearing surface. Exemplary embodiments of channel features and ridge features will be discussed separately for ease of explanation. However, it is appreciated that various combinations of the separately described features can be utilized together or separately on an air bearing surface to achieve a slider with high air bearing damping in contact, out of contact, or both in and out of contact with a disk.

Overview

Figure 1:
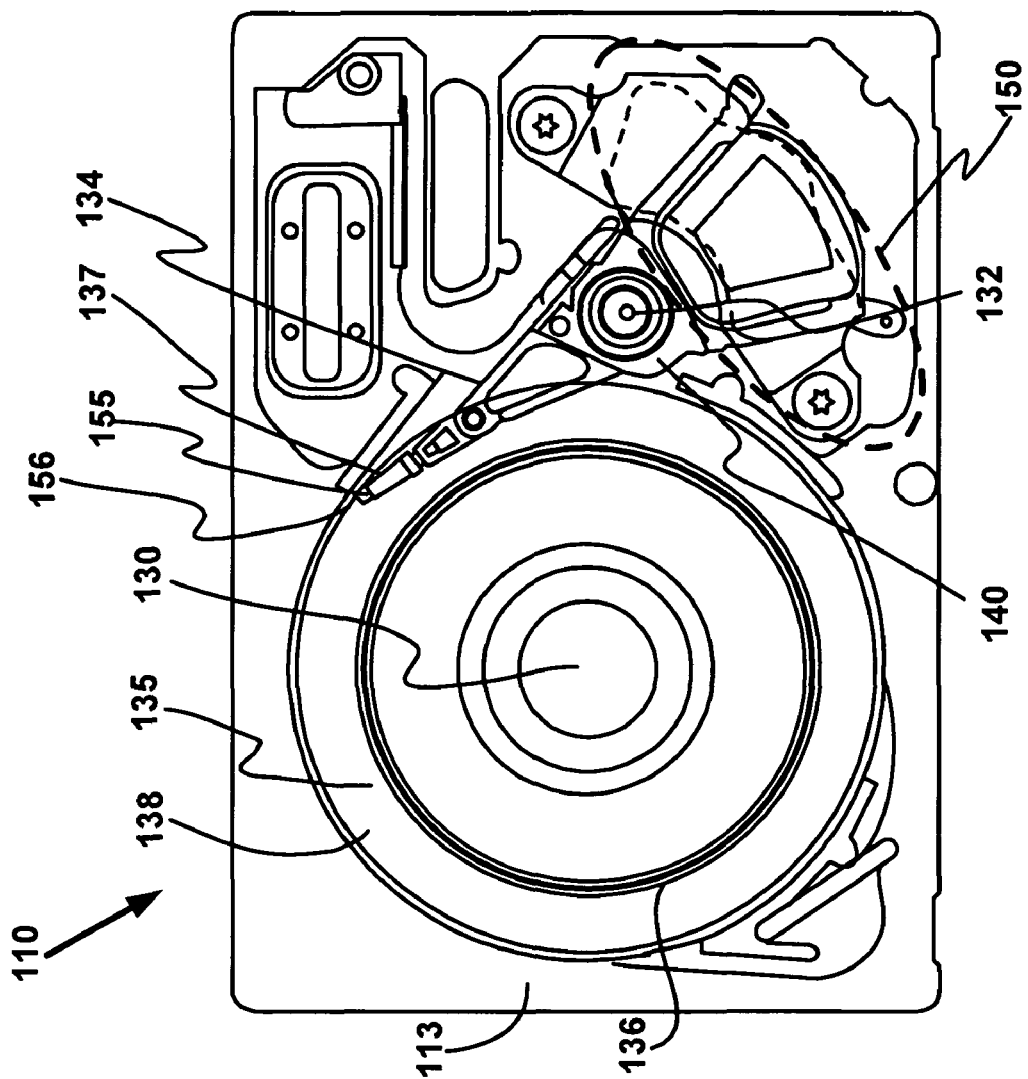
FIG. 1 is a plan view of an HDD with cover and top magnet removed in accordance with one embodiment of the present invention.

With reference now to FIG. 1, a plan view of an HDD 110 with cover and top magnet removed is shown in accordance with one embodiment of the present invention. HDD 110 is a data recording and storage device. FIG. 1 illustrates the relationship of components and sub-assemblies of HDD 110 and a representation of data tracks 136 recorded on the data surfaces 135 (one shown) of disks 138 (one shown). The cover is removed and not shown so that the inside of HDD 110 is visible. The components are assembled into base casting 113, which provides attachment and registration points for components and sub-assemblies.

A plurality of suspension assemblies 137 (one shown) are attached to the actuator arms 134 (one shown) in the form of a comb. A plurality of sliders 155 (one shown) are attached respectively to the suspension assemblies 137. Sliders 155 are located proximate to the data surfaces 135 for reading and writing data with magnetic transducer heads 156 (one shown) that are coupled to sliders 155. The rotary voice coil motor 150 rotates actuator arms 134 about the actuator shaft 132 in order to move the suspension assemblies 137 and sliders 155 to the desired radial position on disks 112 to allow transducers 156 to read and write data. The complete head assembly, e.g., the suspension, slider, and transducer head, is often called a head gimbal assembly (HGA). The actuator shaft 132, hub 140, actuator arms 134, and voice coil motor 150 may be referred to collectively as a rotary actuator assembly.

Data is recorded onto data surfaces 135 in a pattern of concentric rings known as data tracks 136. Data surface 135 is spun at high speed by means of rotator, such as motor-hub assembly 130. Motor-hub assembly 130 rotates data surfaces 135 of disks 138 about an axis generally perpendicular to data surfaces 135. Data tracks 136 are recorded onto (or read from) spinning data surfaces 135 by means of magnetic transducer heads 156 (one shown), which typically reside at the end of sliders 155 (one shown). FIG. 1 being a plan view shows only a single transducer head, disk, and disk surface combination. One skilled in the art understands that what is described for one head-disk combination applies to multiple head-disk combinations, such as disk stacks (not shown). However, for purposes of brevity and clarity, FIG. 1 only shows one head, one disk, and one data surface.

The dynamic performance of HDD 110 is a major mechanical factor for achieving higher data capacity as well as for manipulating this data faster. The quantity of data tracks 136 recorded on data surfaces 135 is determined partly by how well a particular magnetic transducer head 156 and a particular desired data track 136 can be positioned to each other and made to follow each other in a stable and controlled manner.

There are many factors that will influence the ability of HDD 110 to perform the function of positioning a particular magnetic transducer head 156, and following a particular data track 136 with the particular magnetic transducer head 156. In general, these factors can be put into two categories; those factors that influence the motion of magnetic transducer heads 156; and those factors that influence the motion of data tracks 136. Undesirable motions can come about through unwanted vibration and undesirable tolerances of components. Herein, attention is given to construction of sliders 155 and features that contribute to passive damping both in and out of contact with data surfaces 135. These passive damping features help to better maintain sliders 155 (and magnetic transducer heads 156) in an operative relationship with data surfaces 135 when disks 138 are rotating.

Physical Description of Channel Features in Air Bearing Pads

Figure 2:
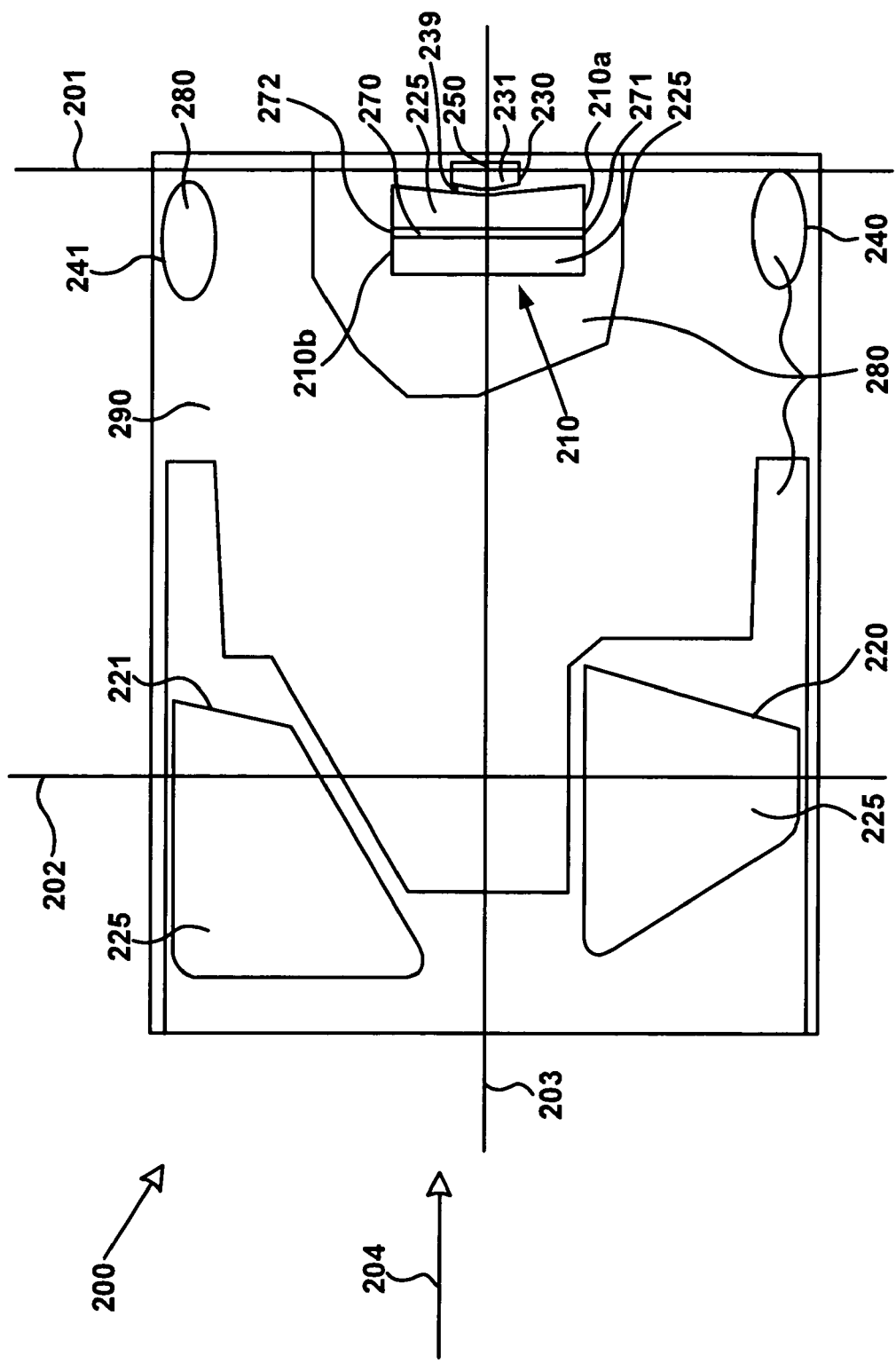
FIG. 2 is a top view of an air bearing surface of a slider, in accordance with one embodiment of the present invention.

FIG. 2 is a top view of an air bearing surface (ABS) 200 of a slider, in accordance with one embodiment of the present invention. ABS 200 is comprised of two leading edge pads 220 and 221, a trailing edge pad 210, load/unload pads 240 and 241, and an optional touch pad 230.

ABS 200 is composed of surfaces at different levels. Level 225 represents surfaces at the air bearing level. Level 225 is considered the zero level from which all other surfaces are measured. Level 280 represents surfaces at a level below air bearing level 225. Surfaces at level 280 are located, for instance, at 180 nanometers below level 225 in one embodiment. Level 290 represents surfaces that are below level 280. Surfaces at level 290 are located, for instance, at 1.52 microns below level 225 in one embodiment. Level 231 represents a level that is either flush with surfaces at level 225, or in some embodiments protruding slightly above level 225. In one embodiment level protrudes up to approximately 30 nanometers above level 225.

Line 201 extends across ABS 200 and represents an approximate axis of pitch one mode oscillation. In other words, line 201 represents the nodal line of the pitch one vibration. Vibrations caused by pitch one mode oscillations occur about axis 201 and are typically problematic at approximately 120 kHz. Line 202 extends across ABS 200 and represents an approximate axis of pitch two mode oscillation. Vibrations caused by pitch two mode oscillations occur about axis 202 and are typically problematic at approximately 250 kHz. Line 203 extends across ABS 200 and represents an approximate axis of roll. Roll mode vibrations occur about axis 203 and are typically problematic at approximately 100 kHz.

Load/unload (LUL) pads 240 and 241 are located at trailing edges of ABS 200. LUL pad 240 has a surface at level 280. Likewise, LUL pad 241 also has a surface at level 280.

Leading edge pads 220 and 221 are oriented at the leading edge portion of ABS 200 and have surfaces at air bearing level 225. Air flows across ABS 200 in direction 204, and creates high pressure areas as it flows across air bearing level 225 of leading edge pads 220 and 221. The exterior outlines of leading edge pads 220 and 221 are exemplary and can be different in other embodiments of the present invention.

Trailing edge pad 210 is oriented at the rear of ABS 200. Trailing edge air bearing pad 210 has a surface at air bearing level 225. As air flows across ABS 200 in direction 204, it creates high pressure areas as it flows across air bearing levels 225 of trailing edge pad 210. The exterior outline of trailing edge air bearing pad 210 is exemplary, and takes other shapes in other embodiments of the present invention.

Figure 16:
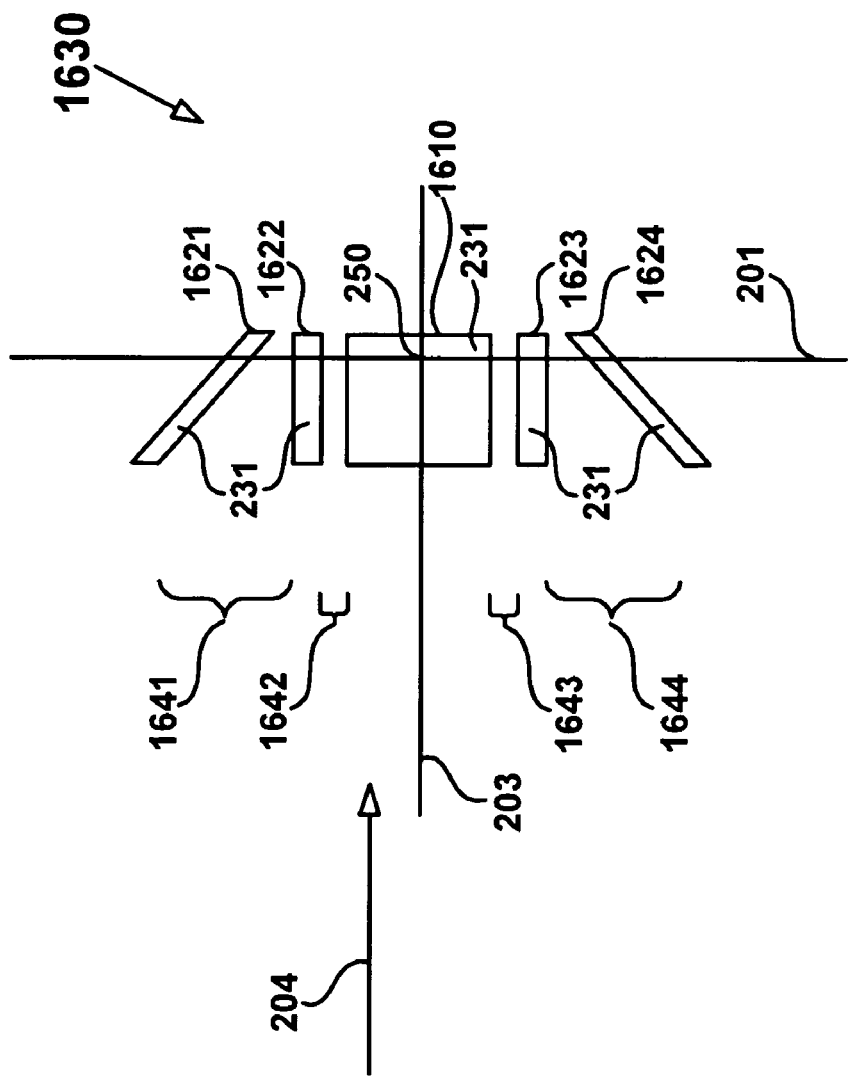
FIG. 16 is an exemplary touch pad configuration in accordance with one embodiment of the present invention.
Figure 17:
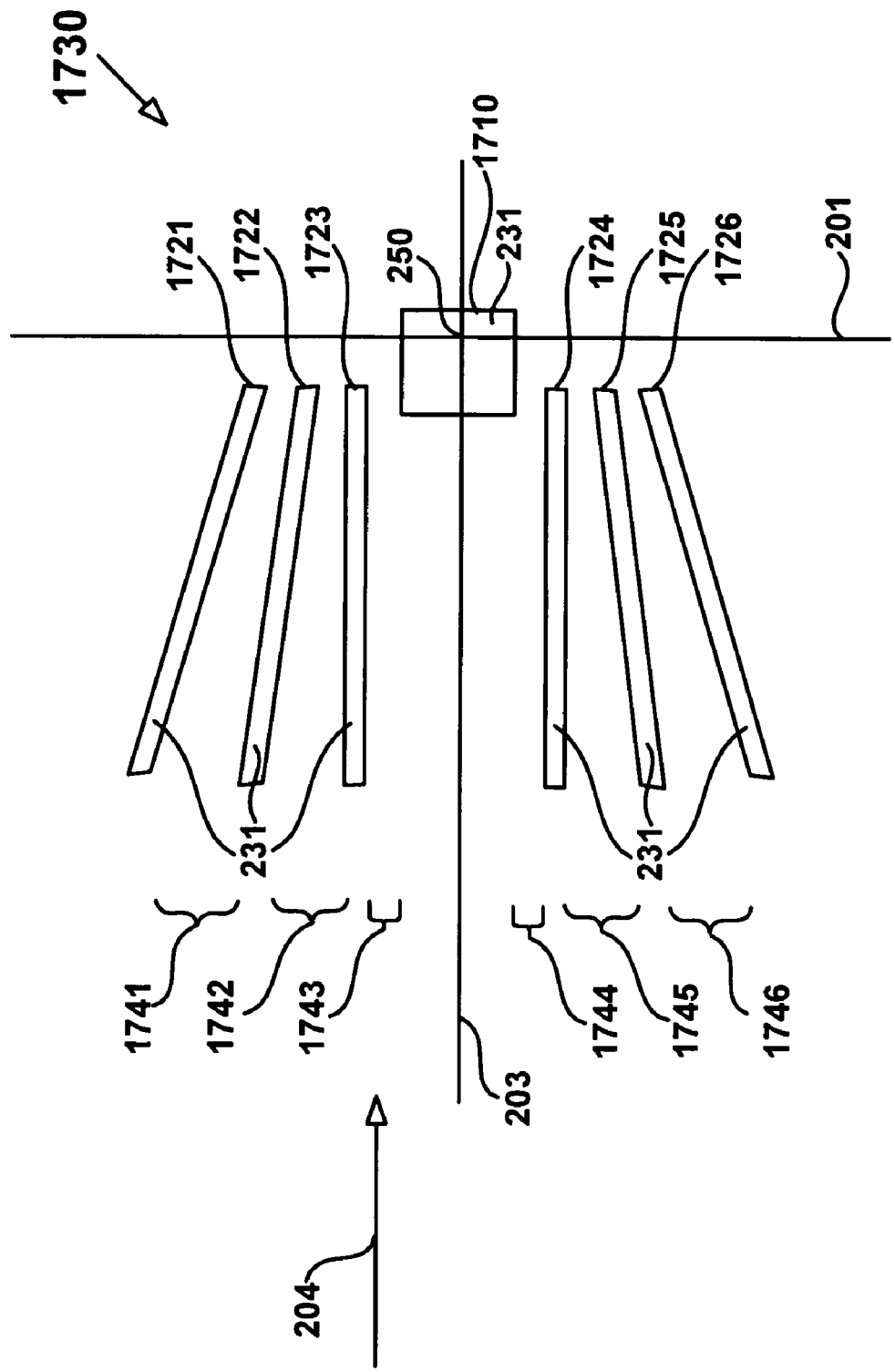
FIG. 17 is an exemplary touch pad configuration in accordance with one embodiment of the present invention.
Figure 18:
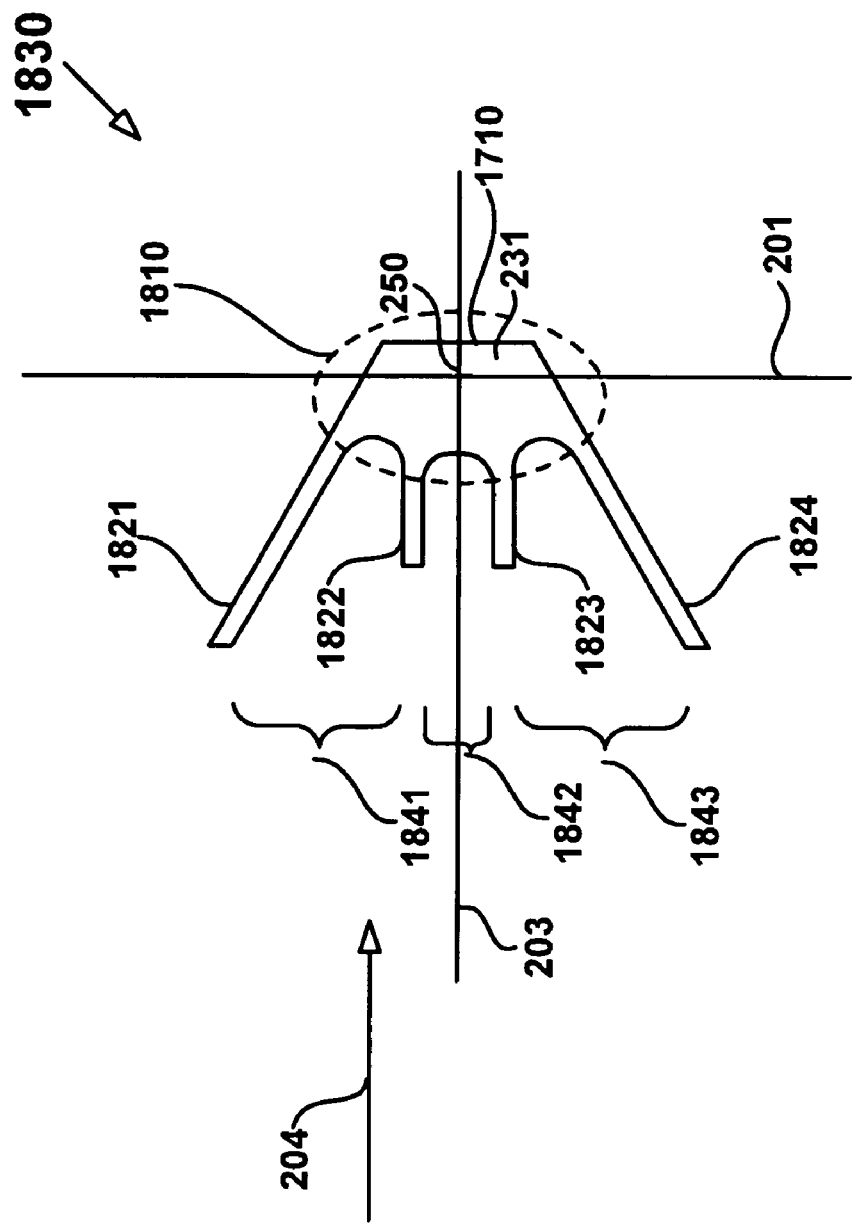
FIG. 18 is an exemplary touch pad configuration in accordance with one embodiment of the present invention.

Touch pad 230 is shown in an optional configuration separated from trailing edge air bearing pad 210 by open ended channel 239. In other embodiments, channel 239 is not used, and instead trailing edge air bearing pad 210 is formed as a single unseparated piece with touch pad 230. Touch pad 230 surrounds the location of the magnetic transducer head. The magnetic transducer head is not visible in FIG. 2, but is located approximately at the intersection 250 of roll axis 203 and pitch one axis 201. In FIG. 2, touch pad 230 is shown in a substantially rectangular configuration, as is well known in the art. Other embodiments of a separated touch pad, such as described in FIGS. 16, 17, and 18 are also amenable to use with ABS 200. In some embodiments, surface 231 is flush and level with air bearing level 225. In other embodiments, such as when the magnetic transducer head is designed to be burnished, surface 231 protrudes slightly above air bearing level 225. In such an embodiment, surface 231 is often burnished off until it is approximately level with air bearing level 225.

The axes of roll 203 and pitch one 201 intersect over the magnetic transducer head, and therefore vibrations in these modes often have little impact on the performance of the magnetic transducer head during normal operation. However, load and unload operations create high level excitations of the slider in the pitch one and roll modes. Controlling pitch one mode and roll mode vibrations is very important during load and unload operations, as this helps prevent media damage and smoothens the load and unload processes. This is especially important when a slider is loaded into a data zone instead of a special loading zone on the disk.

Pitch two axis 202 is situated at the front of the slider. Because of this, vibrations about pitch two axis 202 contribute to flying height instability. Flying height instability can cause fluctuations in spacing between the magnetic transducer head and the surface of the disk. These fluctuations lead to negative performance of the magnetic transducer head during normal operation. Thus eliminating pitch two mode vibrations is very useful for improving slider and magnetic transducer head performance.

The present invention relates to passive damping by creating recessed channels and/or raised ridges in various portions of the air bearing surface of a slider. These channels and/or ridges create large pressure gradients that cause particular modes of damping to go up significantly depending on the location and configuration of the channels and/or ridges. Channels improve damping when the slider is flying (out of contact), while ridges improve damping when the slider is in contact with the disk surface.

Figure 3A:
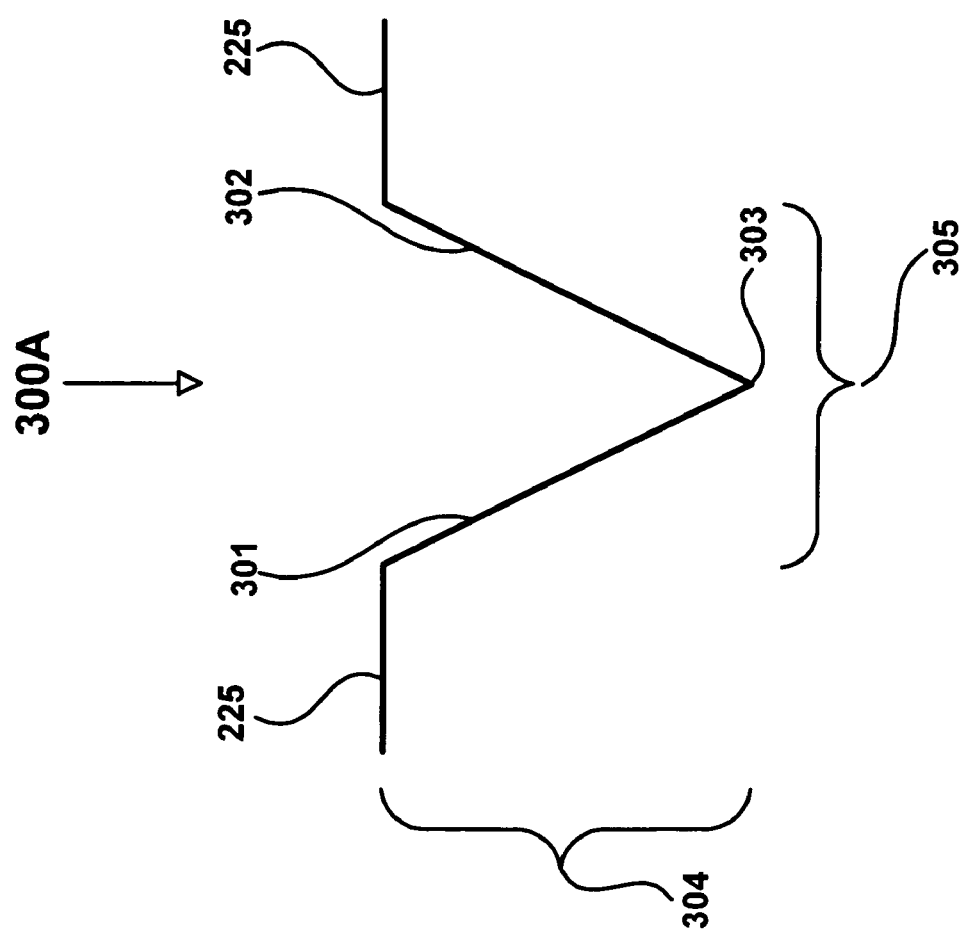
FIG. 3A is a cross-sectional view of an exemplary channel, in accordance with one embodiment of the present invention.
Figure 3C:
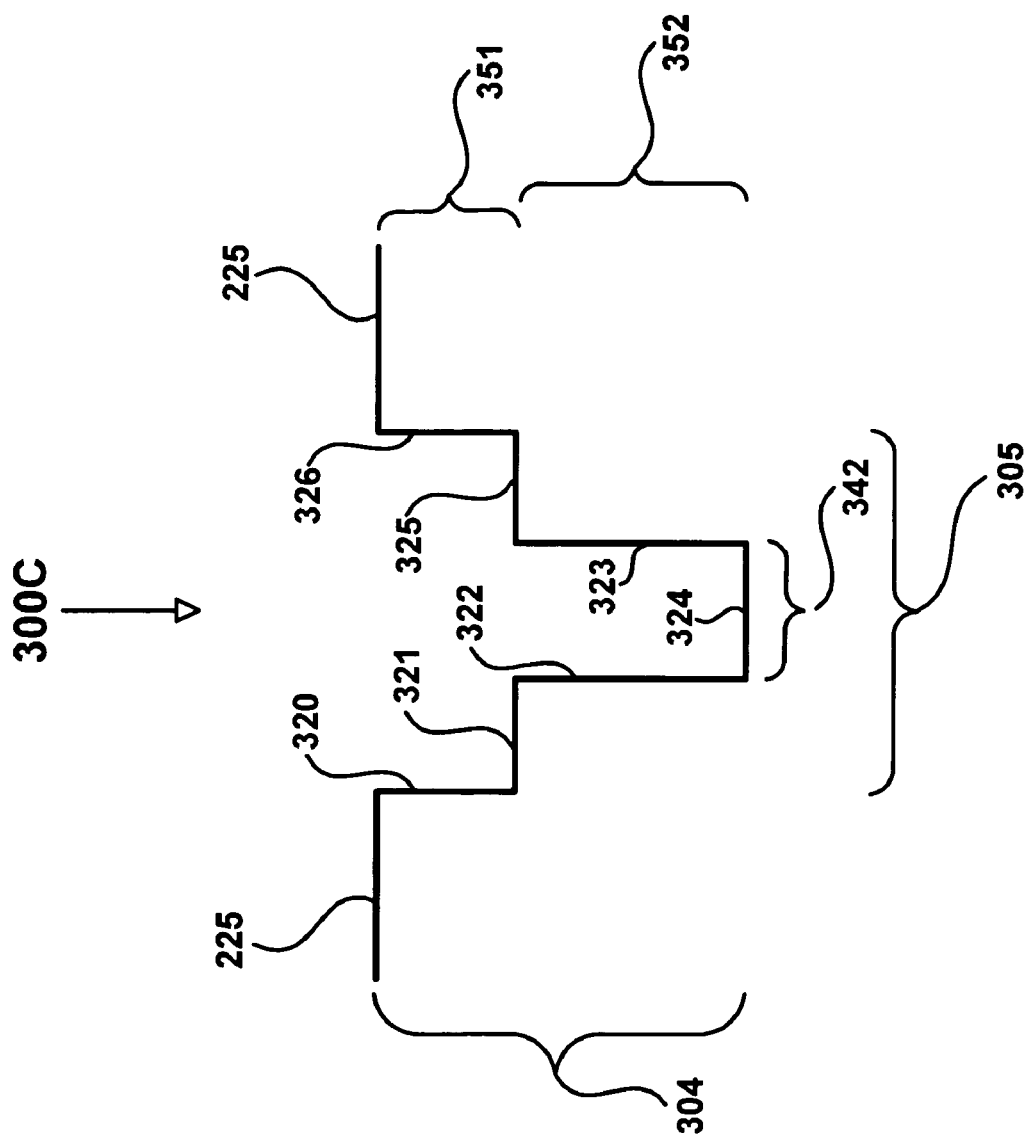
FIG. 3C is a cross-sectional view of an exemplary channel, in accordance with one embodiment of the present invention.

For instance, placing a channel or channels on trailing edge air bearing 210, improves pitch two damping by creating a large pressure gradient. The air pressure drops significantly at each channel leading to large pressure gradients between the air bearing area 225 and the bottom of the channel. Channel 270 is one example of such a channel. Channel 270 is recessed into surface 225 of trailing edge air bearing pad 210. Channel 270 has an open top and is oriented substantially perpendicular to the direction of air flow 204 across trailing edge air bearing pad 210 and is open on ends 271 and 272. Other embodiments utilize two, three, or more open ended channels such as channel 270, spaced across surfaces 225 of trailing edge air bearing pad 210. In other embodiments, one or more such open ended channels can be recessed in the air bearing surface 225 of another air bearing pad, such as leading edge air bearing pad 221 and/or 220. Adding such open ended channels on a leading edge pad (220, 221) or middle pad (not shown) results in large pressure gradients being formed over each of the channels (as previously described). The large pressure gradients on leading edge and/or middle pads result in improved pitch one mode damping and roll mode damping of the slider. FIG. 3A, FIG. 3B, and FIG. 3C all show alternative cross-sectional views of the recessed portion of a channel such as channel 270. Additionally, other embodiments of the present invention are amenable to other more difficult to form channel shapes, such as channels with rounded bottoms.

FIG. 2 additionally illustrates how an open ended channel, such as channel 272 is utilized to divide an air bearing pad, such as trailing edge air bearing pad 210, into smaller air bearing sub-pads 210a and 210b. Use of additional open ended channels will allow more air bearing sub-pads to be created. In one embodiment of the present invention, a recessed channel (as described in FIG. 5, FIG. 11, and FIG. 14) is configured in one or more of the air bearing sub-pads, such as 210a.

FIG. 3A is a cross-sectional view of an exemplary channel 300A, in accordance with one embodiment of the present invention. Channel 300A displays exemplary features which are utilized on an ABS for a head assembly of a data storage device, in one embodiment of the present invention. Channel 300A is a v-shaped notch recessed from a surface at air bearing level 225 of an air bearing pad. Channel 300A has a depth 304 measured from level 225 to the bottom 303. Channel 300A also has an open top with a width 305 measured by the maximum distance between the top edge of interior side 301 and the top edge of interior side 302. Channel 300A is amenable to construction through reductive means known in the art, such as reactive ion etching or ion milling.

FIG. 3B is a cross-sectional view of an exemplary channel 300B, in accordance with one embodiment of the present invention. Channel 300B displays exemplary features which are utilized on an ABS for a head assembly of a data storage device, in one embodiment of the present invention. Channel 300B is a single rectangular trench recessed from a surface at air bearing level 225 of an air bearing pad. Channel 300B has a depth 304 measured from level 225 to the bottom 312. Channel 300B also has an open top with a width 305 measured by the maximum distance between the top edge of interior side 310 and the top edge of interior side 311. Channel 300B is amenable to construction through reductive means known in the art, such as reactive ion etching or ion milling.

FIG. 3C is a cross-sectional view of an exemplary channel 300C, in accordance with one embodiment of the present invention. Channel 300C displays exemplary features which are utilized on an ABS for a head assembly of a data storage device, in one embodiment of the present invention. Channel 300C is a double rectangular trench or a two-step channel recessed from a surface at air bearing level 225 of an air bearing pad. Surfaces 321 and 325 represent the bottom of the first trench. Surface 324 represents the bottom of the second trench and the bottom of channel 300C. Channel 300C has an overall depth 304 measured from level 225 to bottom 324. Channel 300C has a first intermediate depth 351 of the first trench as measured from surface 321 or 325 to level 225. Channel 300C has a second intermediate depth 352 of the second trench as measured from surface 321 or 325 to level bottom 324.

Channel 300C has an open top with a width 305 measured by the maximum distance between the top edge of interior side 320 and the top edge of interior side 326. The second rectangular trench has an open top with a width 342 measured as the maximum distance between the top edge of side 322 and the top edge of side 323. The second rectangular trench is shown substantially centered within the first rectangular trench, though in other embodiments centering of the second rectangular trench is not required. Channel 300C is exemplary of a multi-stepped channel, and it is appreciated embodiments of the present invention can comprise similar channels having many more than the two steps shown. Multi-stepped channels such as 300C are amenable to construction through reductive means known in the art, such as reactive ion etching or ion milling.

Figure 4:
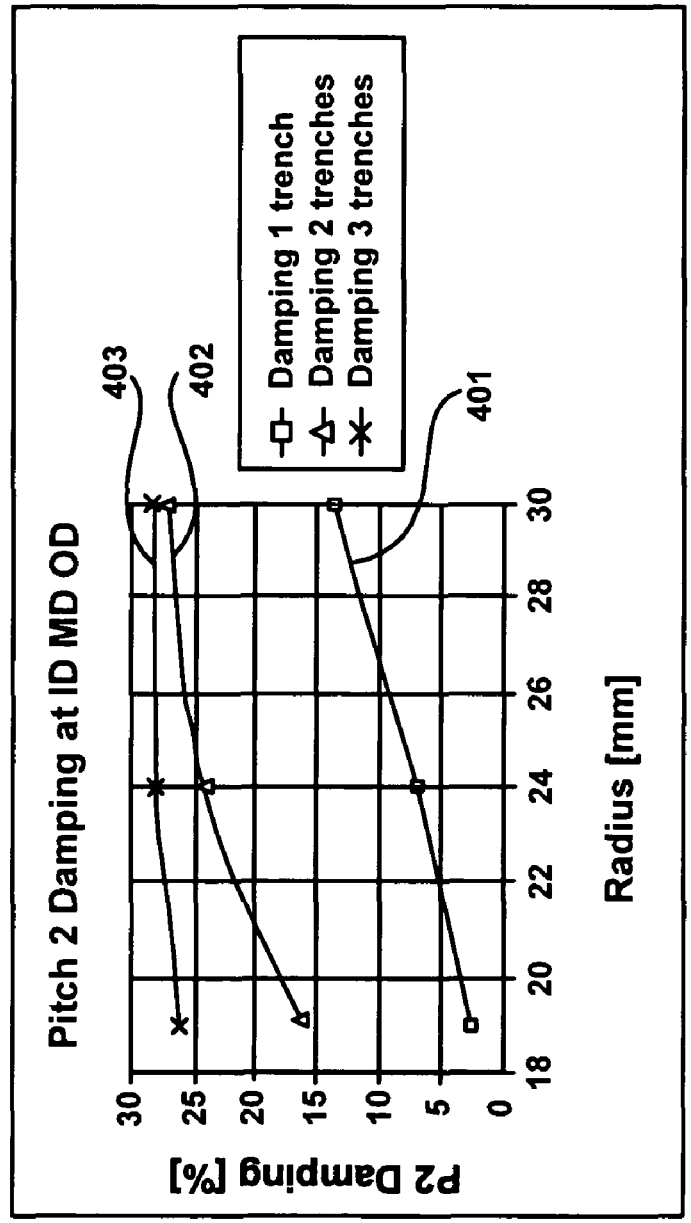
FIG. 4 is a graph illustrating pitch two mode damping of exemplary sliders at various disk locations, in accordance with one embodiment of the present invention.

FIG. 4 is a graph 400 illustrating pitch two mode damping of exemplary sliders at various disk locations, in accordance with one embodiment of the present invention. Graph 400 shows damping results of sliders at the inner diameter (ID), middle diameter (MD) and outer diameter (OD) of a disk. Data for graph 400 was collected utilizing sliders with an air bearing surface 200 (FIG. 2) having either one, two, or three open ended channels, such as 270, recessed within surfaces 225 of trailing edge air bearing pad 210. Line 401 shows the results using a single open ended channel. Lined 402 shows results achieved using two open ended channels. Line 403 shows results achieved using three open ended channels. Channels utilized were of a rectangular trench shape as shown in FIG. 3B, had a depth 304 of approximately 1-2 μm, a width 305 of approximately 10-12 μm, and length of slightly over 200 μm. Flying height was within a range of approximately 6.75 nm to 7.5 nm at any location across the diameter of the disk.

In FIG. 4, Line 403 shows that pitch two mode damping of up to approximately 30% is achieved using a configuration with three channels. A control air bearing surface similar to surface 200, but having no channels in pad 210 exhibited maximum pitch two mode damping of approximately 2.6%. FIG. 4 also shows that adding a additional channels causes pitch two damping to become more independent of the location of the head on the disk. Adding additional channels also increases pitch two damping to approximately 30%.

Figure 5:
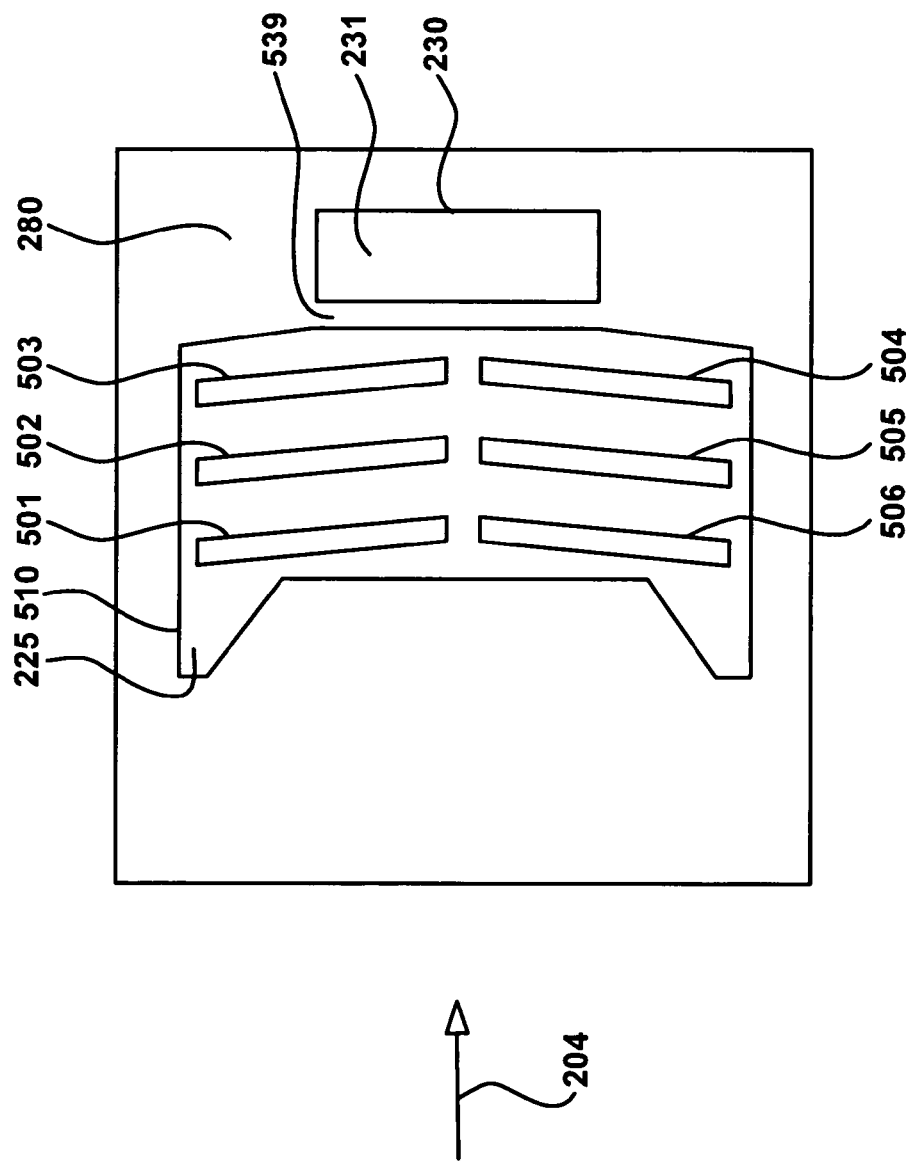
FIG. 5 is a detail view of an exemplary trailing edge air bearing pad, in accordance with one embodiment of the present invention.

FIG. 5 is a detail view of an exemplary trailing edge air bearing pad 510, in accordance with one embodiment of the present invention. Trailing edge air bearing pad 510 displays exemplary features which are utilized on an ABS for a head assembly of a data storage device, in one embodiment of the present invention. Trailing edge air bearing pad 510 is comprised of a surface 225 with a plurality of recessed channels (501, 502, 503, 504, 505, and 506) that are formed with open tops and located entirely within boundaries of trailing edge air bearing pad 510.

Trailing edge air bearing pad 510 is an alternative version of pad 210 utilized in FIG. 2. Pad 510 is similar to pad 210, but has a slightly different external shape designed to funnel air flow over channels (501, 502, 503, 504, 505, and 506) disposed within surface 225 of pad 510. Like pad 210, pad 510 is surrounded by a region of air bearing surface at level 280 (FIG. 2). Pad 510 is also shown accompanied by a substantially rectangular touch pad 230 with a surface at level 231, both previously described in conjunction with FIG. 2. Open ended channel 539 (similar to channel 239 of FIG. 2) separates pad 510 from touch pad 230. In another embodiment of the present invention, where open ended channel 539 is not present, pad 510 is formed as a single unseparated piece with touch pad 230.

In FIG. 5, channels 501-506 are disposed in a lengthwise direction at oblique angles to the direction of air flow 204 over pad 510. In other embodiments, channels 501-506 are disposed in a lengthwise direction at other oblique angles or even perpendicular to direction 204. Channels 501-506 have closed ends, and each recessed channel (510-506) is completely encircled by portions of surface 225 such it is located entirely within boundaries of trailing edge air bearing pad 510. In various embodiments, channels 501-506 are constructed with interior cross-sectional shapes such as a v-shaped notch (FIG. 3A), a single trench (FIG. 3B) or a multi-step trench (FIG. 3C). Additionally, some embodiments have rounded bottoms (not shown). Other embodiments are amenable to utilizing more or less closed ended channels (as few as one). The closed ended channel(s) can be disposed anywhere on surface 225 of pad 510, however greatest effect is achieved by locating the closed ended channel(s) contemporaneously with pre-existing pressure peaks.

In one embodiment, a trailing edge air bearing pad with a channel arrangement, as shown on pad 510, is utilized with an air bearing surface such as ABS 200 (FIG. 2). In such an embodiment, trailing edge pad 510 would replace pad 210 shown in FIG. 2. In such an embodiment, as air flows across ABS 200 and trailing edge air bearing pad 510 in direction 204, large pressure drops are observed at each channel (501, 502, 503, 504, 505, and 506). These pressure drops lead to large pressure gradients which in turn cause very high damping of the slider that ABS 200 is configured on. Angling channels 501-503 toward channels 504-506, as shown in FIG. 5, improves radial independence of damping at locations across the surface of a disk.

Additionally, in another embodiment (not shown), a trailing edge air bearing pad, such as pad 510, is divided into smaller air bearing sub-pads by a recessed open ended channel, such as channel 270 (FIG. 2). One or more enclosed channels, such as channel 510, are then formed in one or more of the air bearing sub-pads.

Figure 6:
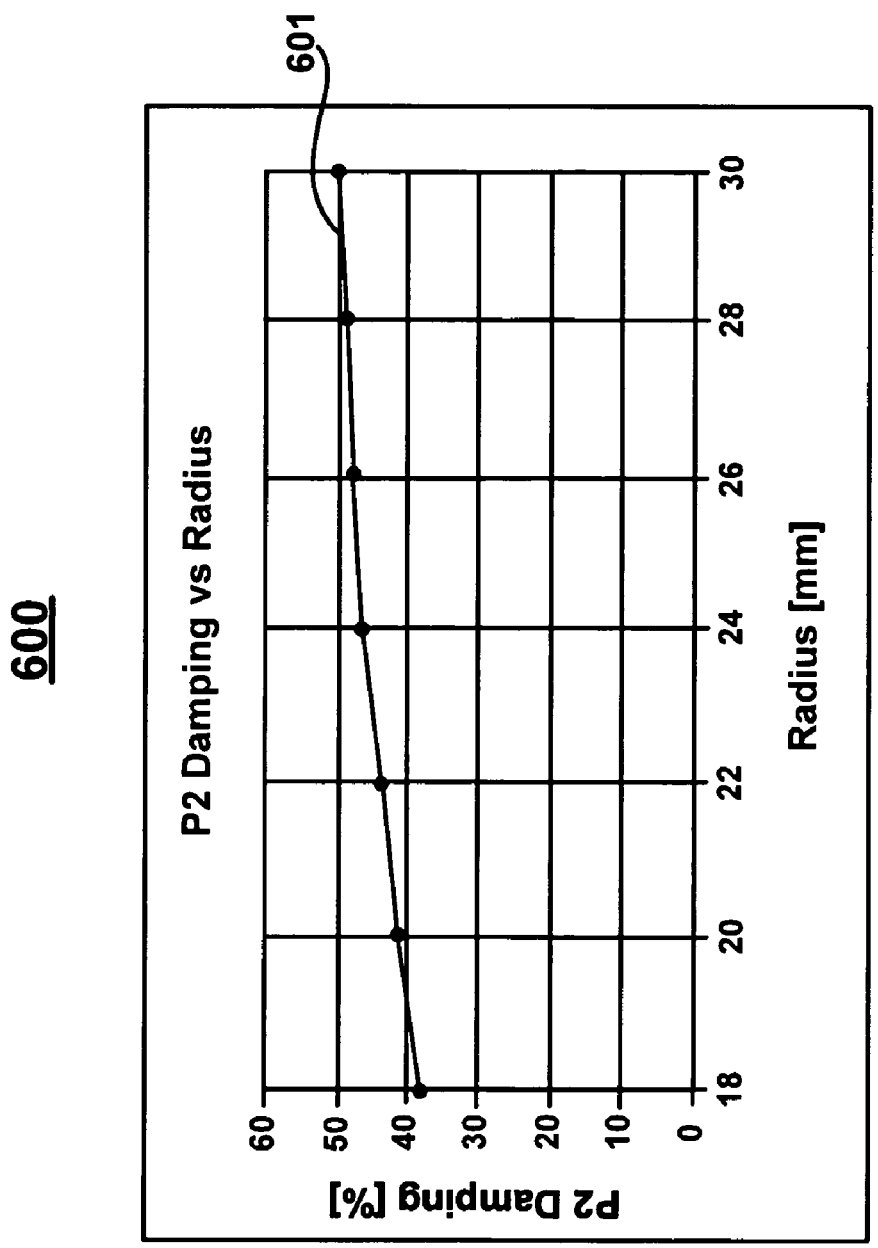
FIG. 6 is a graph illustrating pitch two mode damping of an exemplary slider at various disk locations, in accordance with one embodiment of the present invention.

FIG. 6 is a graph 600 illustrating pitch two mode damping of an exemplary slider at various disk locations, in accordance with one embodiment of the present invention. Data for graph 600 was collected utilizing a slider with an air bearing surface 200 (FIG. 2), having a trailing edge air bearing pad 510 (FIG. 5). Trailing edge air bearing pad 510 was configured with six closed ended channels such as 501-506 recessed within surface 225 of trailing edge air bearing pad 510. Channels 501-506 were of a rectangular trench shape as shown in FIG. 3B, had a depth 304 of approximately 1 μm, a width 305 of approximately 10 μm, and length of slightly over 100 μm. Line 601 shows the results of pitch two damping at locations across a disk surface, with damping of between 35% and 50% across the disk surface. Even though there is a variance, at these high levels, pitch two mode damping is relatively stable across the diameter of the disk.

Figure 7:
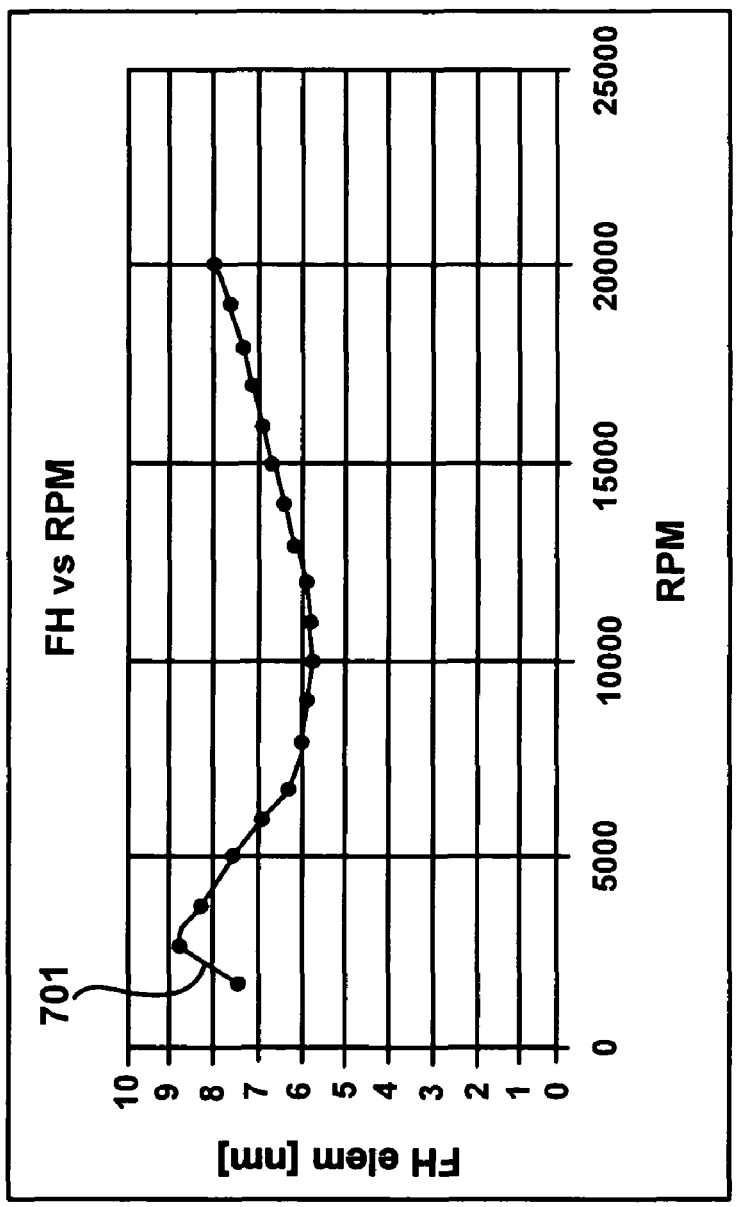
FIG. 7 is a graph illustrating flying height of an exemplary slider at various disk speeds, in accordance with one embodiment of the present invention.

FIG. 7 is a graph 700 illustrating flying height of an exemplary slider at various disk speeds, in accordance with one embodiment of the present invention. Data for graph 700 comes from a slider with the same air bearing surface 200 and trailing edge pad 510 utilized in conjunction with FIG. 6. Line 701 shows flying height of ABS 200 of the tested slider at various disk speeds from approximately 2500 revolutions per minute (RPMs) to approximately 20,000 RPMs. Line 701 shows that flying height remained stable at between approximately 6.75 nm and 8.75 nm.

Figure 8:
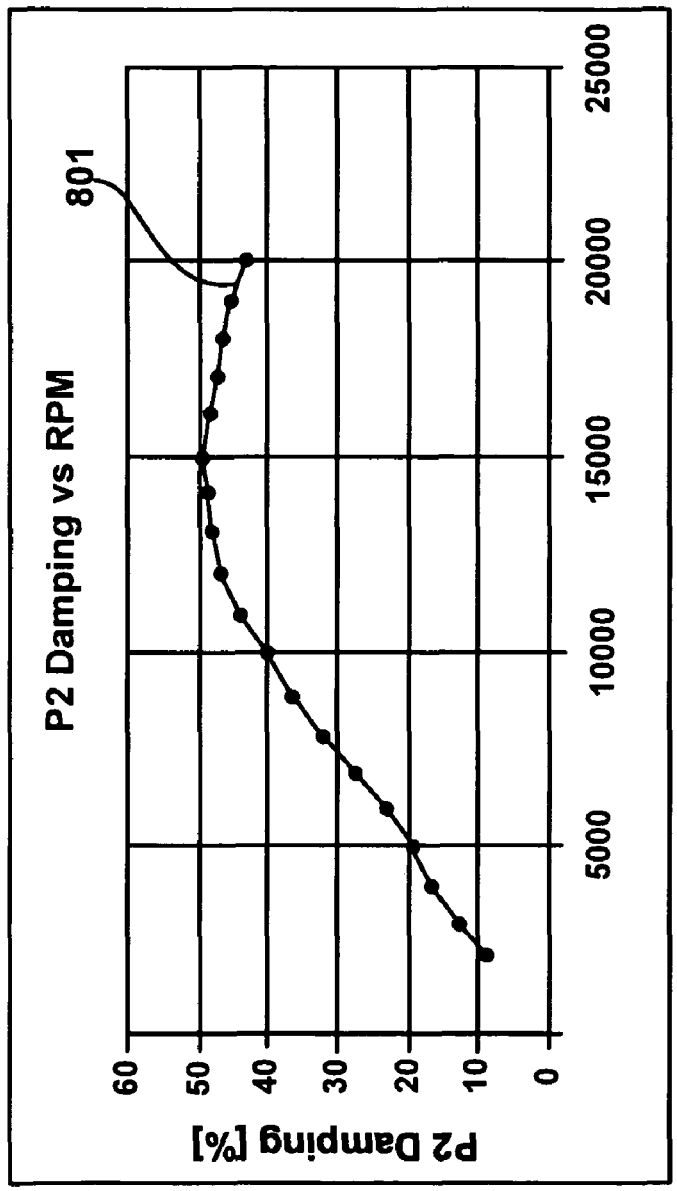
FIG. 8 is a graph illustrating pitch two mode damping of an exemplary slider at various disk speeds, in accordance with one embodiment of the present invention.

FIG. 8 is a graph 800 illustrating pitch two mode damping of an exemplary slider at various disk speeds, in accordance with one embodiment of the present invention. Data for graph 800 comes from a slider with the same air bearing surface 200 and trailing edge pad 510 utilized in conjunction with FIG. 6. Line 801 shows pitch two mode damping exhibited at various disk speeds from approximately 2500 RPMs to 20,000 RPMs. Line 701 shows that pitch two mode damping is relatively high (20%) at a low speed of 5,000 RPMs and is over 40% at approximately 20,000 RPMs. It also becomes evident that air bearing damping is a complex function of disk velocity, slider flying height, slider skew (as seen from damping variations vs. radius) and air bearing (trench) design (i.e. trench depth).

Figure 9:
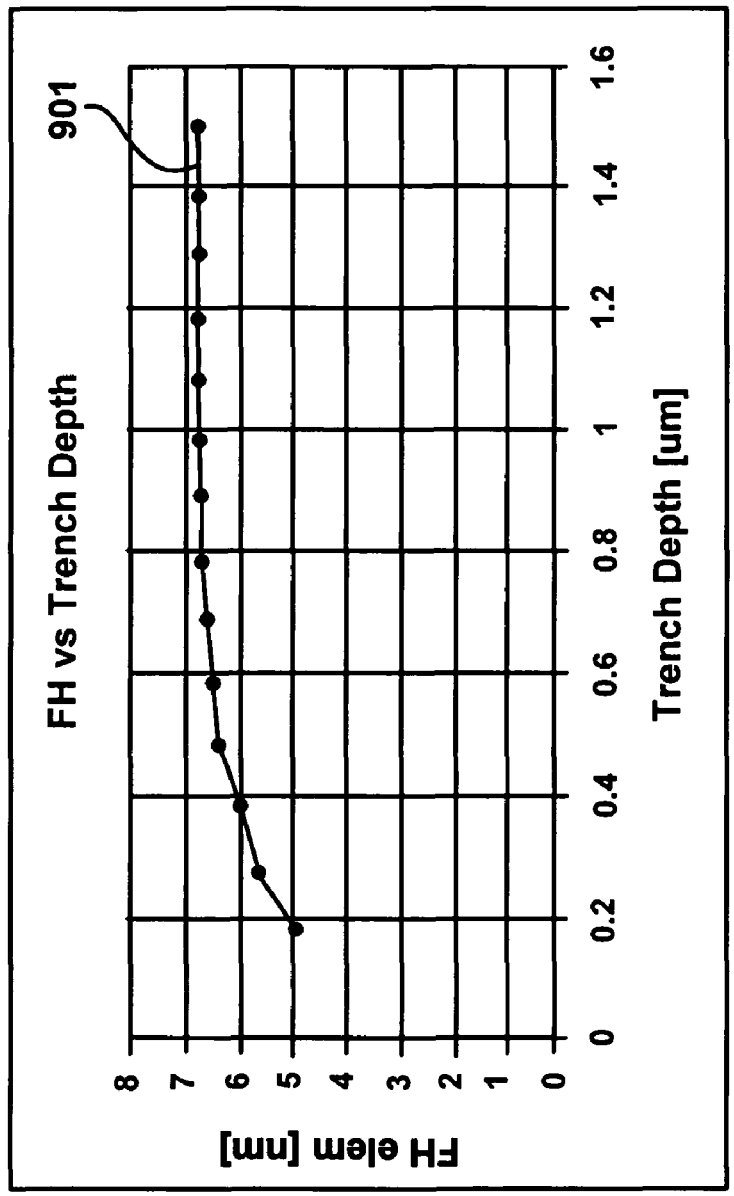
FIG. 9 is a graph illustrating flying height of an exemplary slider configured with channels of various depths in the trailing edge air bearing pad, in accordance with one embodiment of the present invention.

FIG. 9 is a graph 900 illustrating flying height of an exemplary slider configured with channels of various depths in the trailing edge air bearing pad, in accordance with one embodiment of the present invention. Data for graph 900 comes from a slider with the same air bearing surface 200 and trailing edge pad 510 utilized in conjunction with FIG. 6, with one exception. The exception is that channel depth 304 of channels 501-506 was uniformly varied between approximately 0.2 μm and approximately 1.5 μm to demonstrate the relationship between flying height of air bearing surface 200 of the slider and the depth of the channels 501-506. Line 901 shows that flying height increases slightly with increased channel depth, leveling off at a flying height of approximately 6.75 nm with a channel depth of 1 μm or greater.

Figure 10:
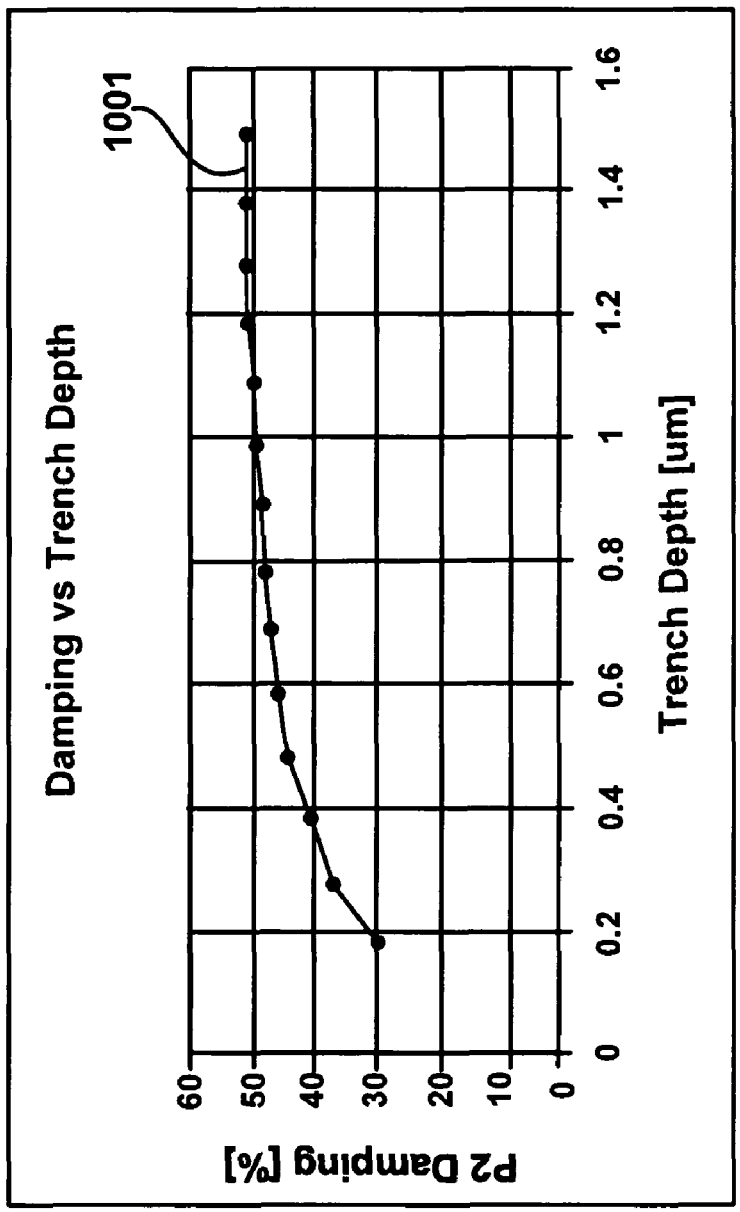
FIG. 10 is a graph illustrating pitch two mode damping of an exemplary slider configured with channels of various depths in the trailing edge air bearing pad, in accordance with one embodiment of the present invention.

FIG. 10 is a graph 1000 illustrating pitch two mode damping of an exemplary slider configured with channels of various depths in the trailing edge air bearing pad, in accordance with one embodiment of the present invention. Data for graph 1000 comes from a slider with the same air bearing surface 200 and trailing edge pad 510 utilized in conjunction with FIG. 6, with one exception. The exception is that channel depth 304 of channels 501-506 was uniformly varied between approximately 0.2 μm and approximately 1.5 μm to demonstrate the relationship between pitch two damping of air bearing surface 200 of the slider and the depth of the channels 501-506. Line 1001 shows that pitch two mode damping increases with increased channel depth, substantially leveling off at approximately 50% with a channel depth of 1 μm or greater.

Figure 11:
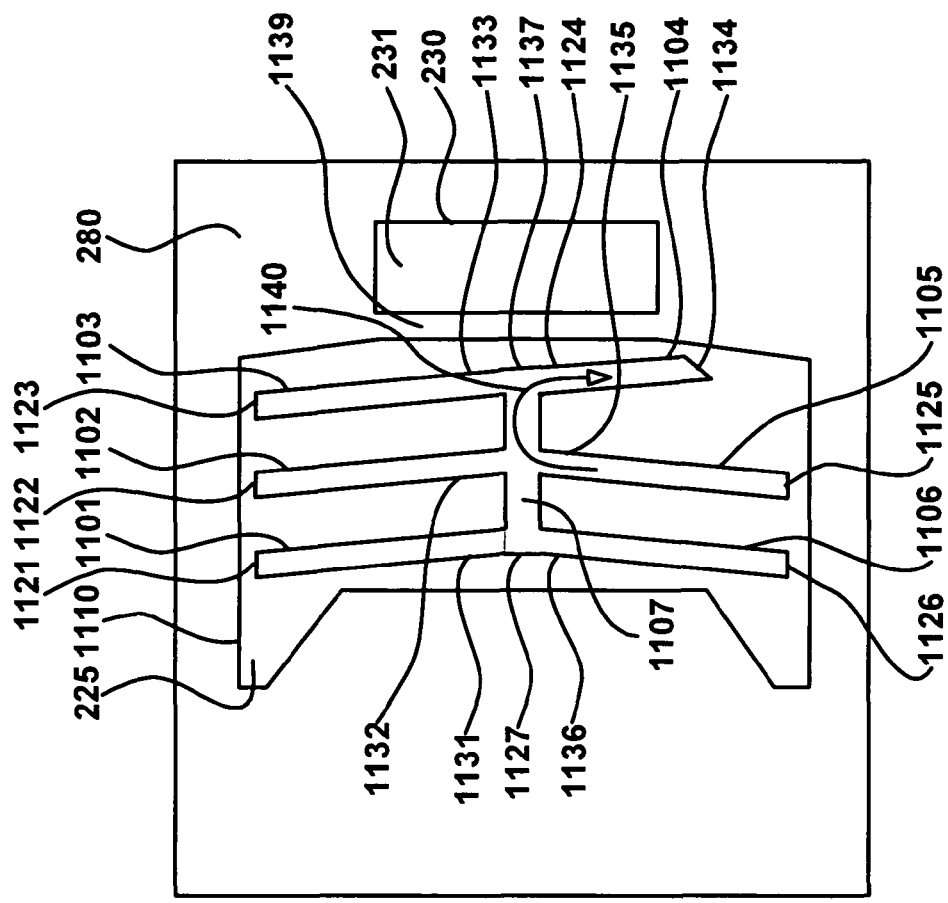
FIG. 11 is a detail view of an exemplary trailing edge air bearing pad, in accordance with one embodiment of the present invention.

FIG. 11 is a detail view of an exemplary trailing edge air bearing pad 1110, in accordance with one embodiment of the present invention. Trailing edge air bearing pad 1110 displays exemplary features which are utilized on an ABS for a head assembly of a data storage device, in one embodiment of the present invention. Trailing edge air bearing pad 1110 is comprised of a surface 225 with a plurality of recessed channels (1101, 1102, 1103, 1104, 1105, 1106, and 1107), that are formed with open tops and located entirely within boundaries of trailing edge air bearing pad 1110.

Trailing edge air bearing pad 1110, like pad 510 (FIG. 5), is an alternative version of pad 210 utilized in FIG. 2. Pad 1110 is similar to pad 210, but has a slightly different external shape. The external shape of pad 1110 is designed to funnel air flow over side channels 1101, 1102, 1103, 1105, and 1106, over debris channel 1104, and over central channel 1107. Embodiments of the present invention are amenable to the use of a variety of other external shapes for pad 1110. All channels 1101-1107 are disposed within surface 225 of pad 1110. In other embodiments a greater or lesser number of channels can be utilized in a similar configuration. Like pads 210 and 510, pad 1110 is surrounded by a region of air bearing surface at level 280 (FIG. 2). Pad 1110 is also shown accompanied by a substantially rectangular touch pad 230 with a surface at level 231, both previously described in conjunction with FIG. 2. Open ended channel 1139 (similar to channel 539 of FIG. 5) separates pad 1110 from touch pad 230. In another embodiment of the present invention, where open ended channel 1139 is not present, pad 1110 is formed as a single unseparated piece with touch pad 230.

In FIG. 11, channels 1101-1106 are disposed in a lengthwise direction at oblique angles to the direction of air flow 204 over pad 1110. In other embodiments, channels 1101-1106 are disposed in a lengthwise direction at other oblique angles or perpendicular angles to direction 204. Channels 1101-1106 have one closed end and an open end that is coupled to and converges into a central channel 1107 configured parallel to direction 204. Central channel 1107 has a leading edge end 1127 and a trailing edge end 1137. Channels 1101-1107 are each recessed within surface 225. The arrangement of coupled channels 1101-1107 is completely encircled by portions of surface 225, with no channel ends open to an outside edge of surface 225, such that channels 1101-1107 are located entirely within boundaries of trailing edge air bearing pad 1110.

In various embodiments, channels 1101-1107 are constructed with interior cross-sectional shapes such as a v-shaped notch (FIG. 3A), a rectangular trench (FIG. 3B) or a multi-step trench (FIG. 3C). Additionally, some embodiments have rounded bottoms (not shown). Other embodiments are amenable to utilizing more or less side channels and debris channels coupled to a central channel. The side channel(s) and debris channel(s) can be disposed anywhere on surface 225 of pad 1110; however greatest effect is achieved by locating the side and/or debris channel(s) contemporaneously with pre-existing pressure peaks. In one embodiment, trailing edge pad 1100 is used to replace trailing edge pad 210 (FIG. 2). In such a configuration, as air flows across ABS 200 (FIG. 2) and trailing edge air bearing pad 1110 in direction 204, large pressure drops are created by each channel (1101, 1102, 1103, 1104, 1105, 1106, and 1107). These pressure drops lead to large pressure gradients and create an increase in pitch two mode damping of the slider that ABS 200 is configured on.

As shown in FIG. 11, leading edge ends 1121, 1122, 1123, 1125, and 1126 and trailing edge end 1134 are all closed. Trailing edge ends 1131, 1132, 1133, 1135, and 1136 and leading edge end 1124 all open into central channel 1107. As in pad 510 (FIG. 5), the angled fishbone orientation of channels 1101-1106 improves radial independence of pitch two mode damping. Adding central channel 1107 provides a central means of coupling debris (such as contaminant particles, disk surface particles, and lube) to debris channel 1104. Air flow in direction 204 tends to move collected debris from a leading edge to a trailing edge of any channel.

Arrow 1140 shows how debris is moved from a side channel, such as side channel 1105, through central channel 1107 and into debris disposal channel 1004. Debris from channels 1101-1107 accumulates in this manner in trailing edge end 1134 of channel 1104, which diverges away from central channel 1107. In some cases accumulated debris is expelled or blown out of trailing edge 1134 by air flow. Trailing edge 1134 is located outside the region of the magnetic transducer head (which is disposed in the region of touch pad 230 as described in FIG. 2). This orientation of debris channel 1104 prevents expelled debris from interfering with the operation of the magnetic transducer head.

In one embodiment, a trailing edge air bearing pad with a channel arrangement, as shown on pad 1110, is utilized with an air bearing surface such as ABS 200 (FIG. 2). In such an embodiment, trailing edge pad 1110 would replace pad 210 shown in FIG. 2. Such an embodiment exhibits similar characteristics as those shown in FIGS. 6, 7, 8, and a similarly consistent characteristic of flying height across the radius of a disk as was discussed with trailing edge pad 510 (FIG. 5). Other characteristics of an embodiment of an ABS 200 utilizing trailing edge pad 1110 are described in conjunction with FIGS. 12 and 13.

Additionally, in another embodiment (not shown), a trailing edge air bearing pad, such as pad 1110, is divided into smaller air bearing sub-pads by a recessed open ended channel, such as channel 270 (FIG. 2). An arrangement of channels, such as channels 1101-1107, is then formed in one or more of the air bearing sub-pads.

Figure 12:
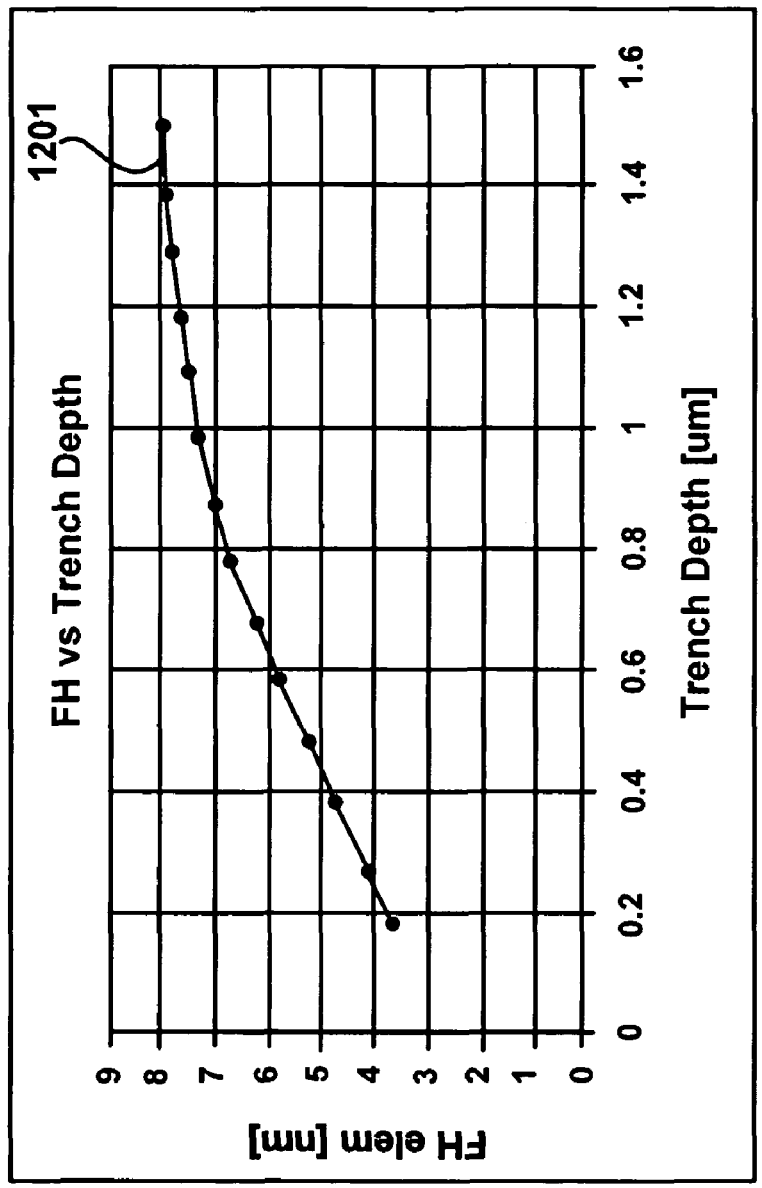
FIG. 12 is a graph illustrating flying height of an exemplary slider configured with channels of various depths in the trailing edge air bearing pad, in accordance with one embodiment of the present invention.

FIG. 12 is a graph 1200 illustrating flying height of an exemplary slider configured with channels of various depths in the trailing edge air bearing pad 1110, in accordance with one embodiment of the present invention. Data for graph 1200 was collected utilizing a slider with an air bearing surface 200 (FIG. 2), having a trailing edge pad 1110 (FIG. 11). Channels 1101-1106 were rectangular trenches as shown in FIG. 3B with a width 305 of approximately 10 μm. Side channels 1101, 1102, 1103, 1105, and 1106 each had a length of approximately 100 μm. Central channel 1107 had a length of approximately 50 μm, and debris channel 1104 had a length of approximately 75 μm. Channel depth 304 of channels 1101-1107 was uniformly varied between approximately 0.2 μm and approximately 1.4 μm to demonstrate the relationship between flying height of air bearing surface 200 of the slider and the depth of the channels 1101-1107. Line 1201 shows that flying height increases with increased channel depth, substantially leveling off at slightly over 7 nm with a channel depth of 1 μm or greater.

Figure 13:
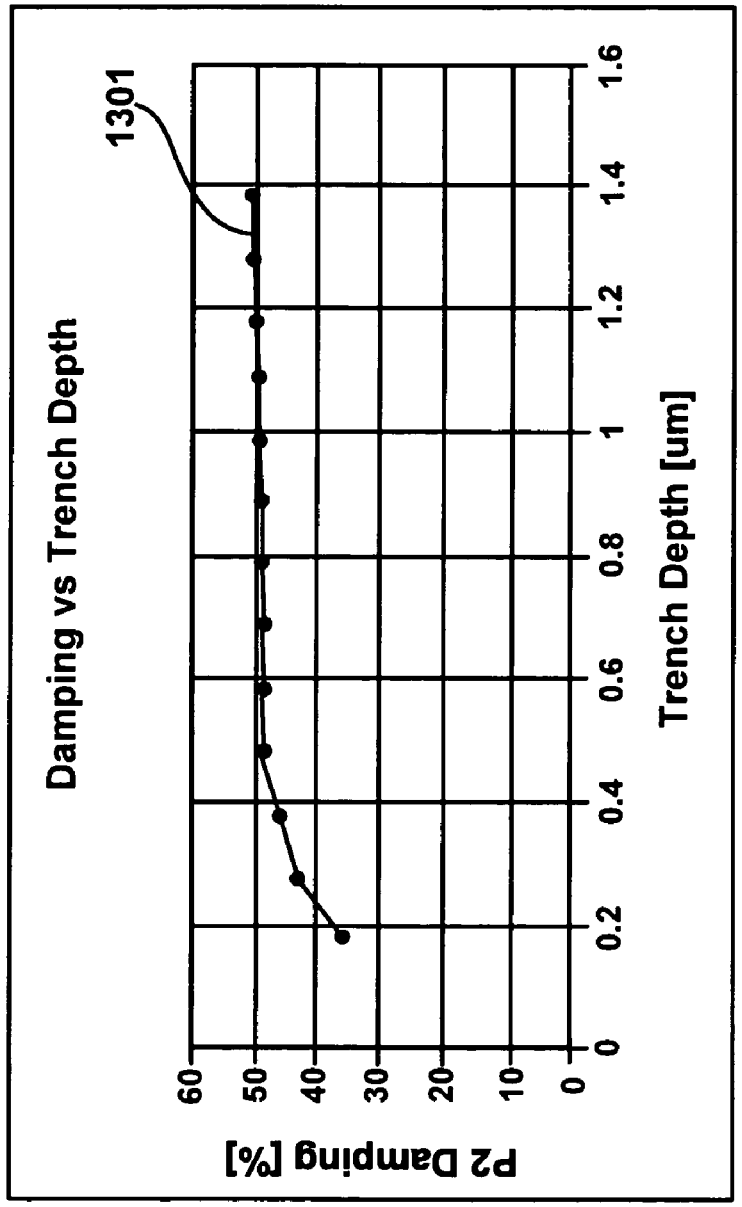
FIG. 13 is a graph illustrating pitch two mode damping of an exemplary slider configured with channels of various depths in the trailing edge air bearing pad, in accordance with one embodiment of the present invention.

FIG. 13 is a graph illustrating pitch two mode damping of an exemplary slider configured with channels of various depths in the trailing edge air bearing pad, in accordance with one embodiment of the present invention. Data for graph 1300 was collected utilizing a slider with an air bearing surface 200 (FIG. 2), having a trailing edge pad 1110 (FIG. 11) as described in conjunction with FIG. 12. Line 1301 shows that pitch two mode damping exceeds 30% with a channel depth of 0.2 μm. Line 1301 also shows that pitch two mode damping increases with increased channel depth, substantially leveling off at approximately 50% with a channel depth of 1 μm or greater.

Figure 14:
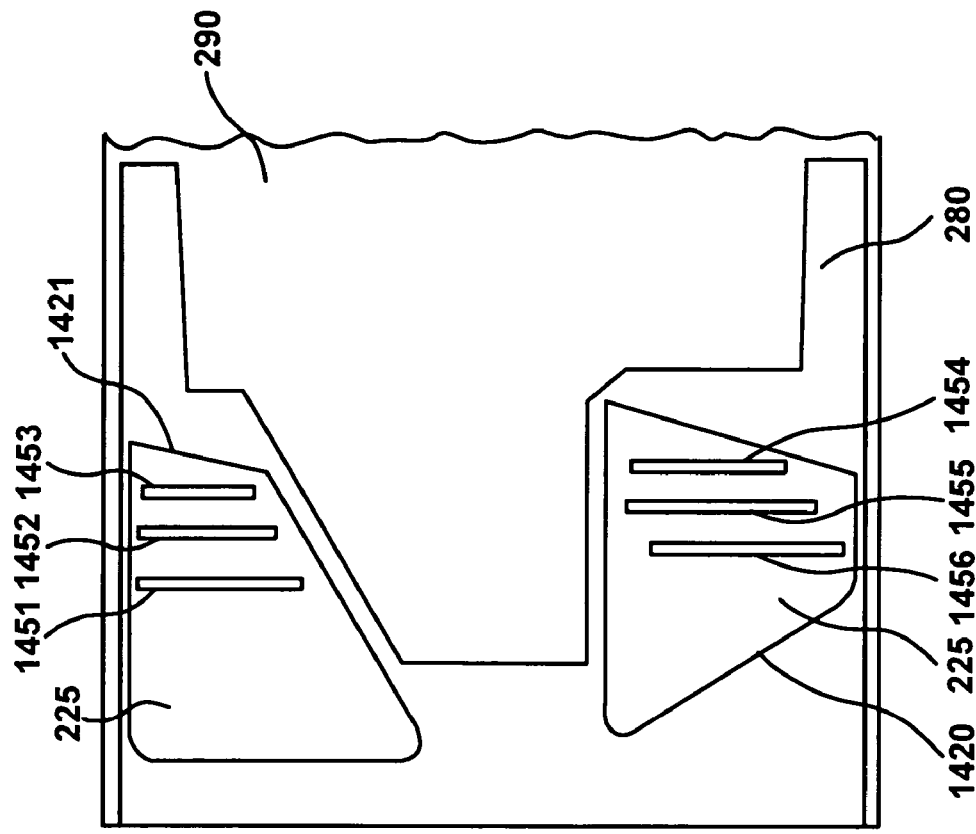
FIG. 14 is a graph illustrating an exemplary air bearing surface with channels in leading edge air bearing pads, in accordance with one embodiment of the present invention.

FIG. 14 is a plan view illustrating a portion of an exemplary air bearing surface 1400 of a slider with channels in leading edge air bearing pads 1420 and 1421, in accordance with one embodiment of the present invention. Leading edge air bearing pads 1420 and 1421 display exemplary features which are utilized on an ABS for a head assembly of a data storage device, in one embodiment of the present invention. FIG. 14 shows a front section of an ABS 1400 similar to ABS 200 of FIG. 2. Levels 225, 280, and 290 are the same as described in conjunction with FIG. 2. ABS 1400 shows open top channels 1451, 1452, 1453, 1454, 1455, and 1456. Channels 1451-1456 are located entirely within the bounds of surfaces 225 in pads 1420 and 1421. Channels 1451-1456 are of the type shown and described in FIG. 5 and FIG. 11, and are recessed into the surfaces of leading edge pad 1420 and 1421 that are at air bearing level 225.

As shown, channels 1451-1456 are disposed with a lengthwise side perpendicular to the direction 204 of air flow of the leading edge pads 1420 and 1421 during operation in a disk drive. In other embodiments, more or less channels can be utilized, with as few as one channel on one of the leading edge air bearing pads. Additionally, a channel, such as 1451, can be disposed at an angle perpendicular, parallel, or oblique to direction 204. A channel, such as 1451, can be located at any point on leading edge air bearing surface and can be coupled into a configuration with other such channels. However, maximum damping will be achieved by disposing a channel, such as 1451, in a region of a leading edge air bearing pad collocated with a pre-existing high pressure peak. FIG. 3A, FIG. 3B, and FIG. 3C show alternative cross sectional views of the recessed portion of channels such as channels 1451-1456. Additionally, other embodiments of the present invention are amenable to other more difficult to form channel shapes, such as channels with rounded bottoms.

Adding enclosed channels (such as channels 1451-1456) in the air bearing level 225 on a leading edge air bearing pad (1420, 1421) or side air bearing pad (not shown) causes large pressure drops at the location of each of the channels in response to air flow in direction 204. These pressure drops lead to large pressure gradients, which in turn cause large increases of slider damping in both pitch one mode and roll mode.

Additionally, in another embodiment (not shown), a leading edge air bearing pad, such as pad 1410, is divided into smaller air bearing sub-pads by a recessed open ended channel, such as channel 270 (FIG. 2). One or more enclosed channels, such as channel 1451, are then formed in one or more of the air bearing sub-pads.

Figure 15:
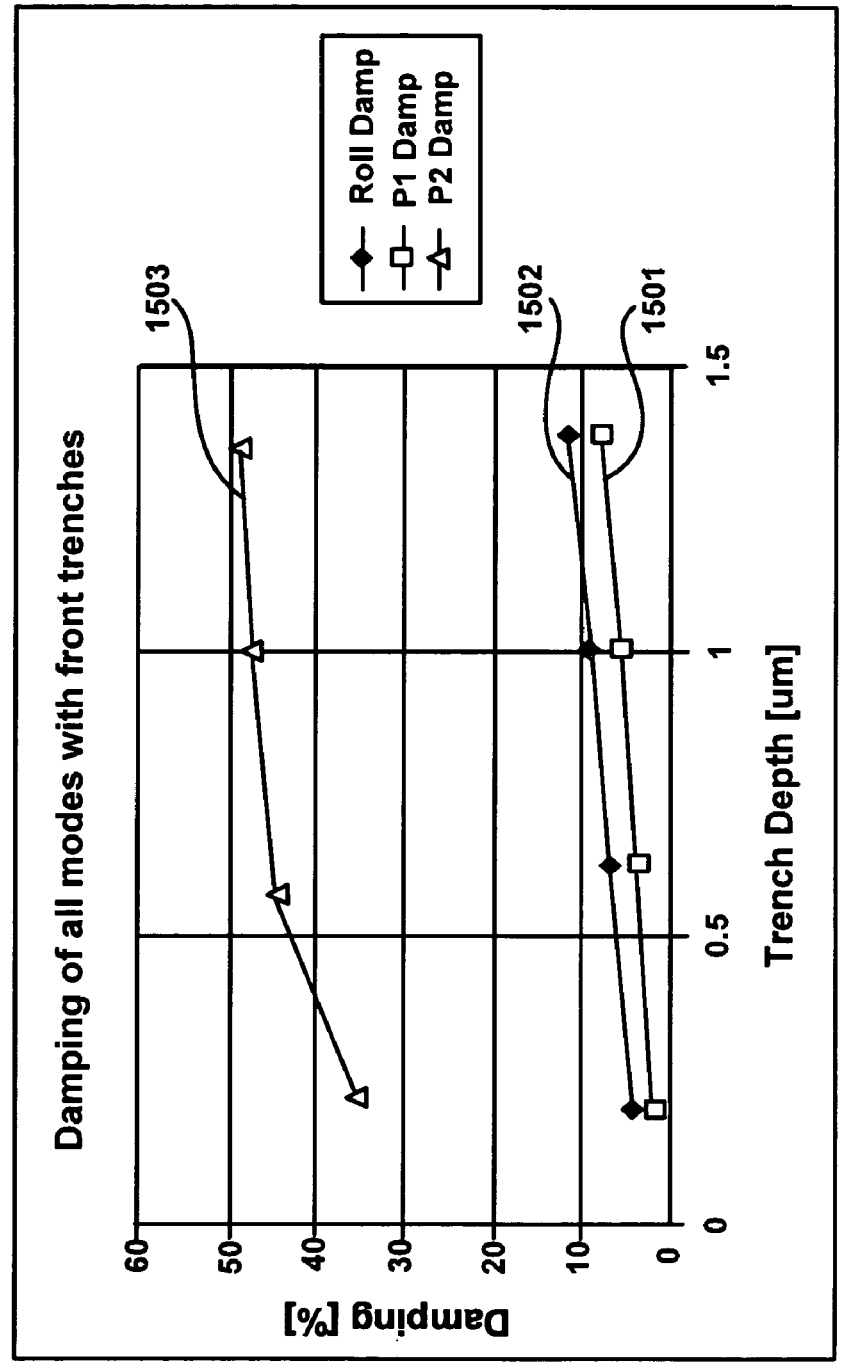
FIG. 15 is a graph illustrating pitch one mode, pitch two mode, and roll mode damping of an exemplary slider, in accordance with one embodiment of the present invention.

FIG. 15 is a graph 1500 illustrating pitch one mode, pitch two mode, and roll mode damping of an exemplary slider, in accordance with one embodiment of the present invention. Data for graph 1500 was generated utilizing a slider with ABS 200 as shown in FIG. 2. ABS 200 was configured with trailing edge pad 510 of FIG. 5 and leading edge pads 1420 and 1421 of FIG. 14. Channels 1451-1456 and 501-506 were closed ended channels recessed within surfaces 225 of trailing edge air bearing pad 510, leading edge air bearing pad 1420, and leading edge air bearing pad 1421. Channels 1451-1456 and 501-506 were v-shaped as shown in FIG. 3A, with a width 305 of approximately 10 μm. Channels 501-506 had a length of slightly over 100 μm, while channels 1451-1456 had a length of approximately 200 nm. Channel depth 304 of channels 1451-1456 and 501-506 was uniformly varied between approximately 0.2 μm and approximately 1.4 μm to demonstrate the relationship between damping modes of air bearing surface 200 of the slider and channel depth.

Line 1501 shows that pitch one mode damping increases with increased channel depth, reaching slightly over 6% at with a channel depth of 1 μm or greater. A similar air bearing surface with no channels in the leading edge air bearing surfaces would demonstrate approximately 1.5% pitch two mode damping. Line 1502 shows that roll mode damping also increases with increased channel depth, reaching approximately 10% at channel depth of 1 μm or greater. A similar air bearing surface with no channels in the leading edge air bearing surfaces would demonstrate approximately 3% roll mode damping. Line 1503 shows that pitch two mode damping also increases with increased channel depth, reaching over 45% at channel depth of 1 µm or greater. As compared to graph 1000, only a slight drop off in pitch two mode damping is realized by adding channels on leading edge surfaces to create increased pitch two mode and roll mode damping.

Physical Description of Raised Features in Touch Pads

Channel features discussed to this point improve damping in various modes when an air bearing surface of a slider is flying, or out of contact with a disk surface. However, at the close flying tolerances, contact with the disk surface is, either accidental or purposeful, is inevitable. Improving pitch two mode damping during contact is desirable to prevent bouncing during burnishing (or other purposeful contact) and to prevent bouncing during intermittent contact while flying. To improve pitch two mode damping and to reduce stiction during slider contact with the disk surface, some embodiments of the present invention utilize raised ridge like features configured into a touch pad area of the air bearing surface.

Exemplary raised features are discussed in FIG. 16, FIG. 17, and FIG. 18. Operation of the raised features is discussed specifically in conjunction with FIG. 16. Raised features in FIGS. 17 and 18 operate similarly to those described in FIG. 16, except where differences are noted. Raised features described in FIGS. 16-18 can be defined in a larger raised area through reductive means known in the art, such as reactive ion etching or ion milling. It is appreciated that other configurations of the types shown can be employed, and that similar configurations can have more or less ridge like features than those shown in FIGS. 16-18. It is also appreciated that in some embodiments, raised features described in FIGS. 16-18 are used alone on a slider without the channel features disclosed above in conjunction with FIGS. 2, 3A-3C, 5, 11, and 14. It is also appreciated that some embodiments, raised features are used together with various combinations of the channel features disclosed above in conjunction with FIGS. 2, 3A-3C, 5, 11, and 14. For example, in one embodiment, an air bearing surface is configured with the raised touch pad (1730) of FIG. 17, the trailing edge air bearing pad (1110) of FIG. 11, and the leading edge air bearing pads (1420 and 1421) of FIG. 14.

FIG. 16 is an exemplary touch pad configuration 1630 in accordance with one embodiment of the present invention. Touch pad configuration 1630 displays exemplary features which are utilized on an ABS for a head assembly of a data storage device, in one embodiment of the present invention. Touch pad 1630 is comprised of a central raised surface 1610 and a plurality of raised ridge surfaces (1621, 1622, 1623, and 1624) disposed adjacent to central surface 1610. Ridge surfaces 1621-1624 extend in a lengthwise direction either parallel (1622 and 1623) to or oblique (1621 and 1624) to the direction 204 of flow experienced across touch pad 1630 when in disk contact.

Pitch one mode and roll mode axes (201, 203) intersect at point 250 on central surface 1610. Axis 203 also represents a longitudinal axis of an ABS, such as ABS 200 of FIG. 2. Point 250 is the approximate location of the magnetic transducer head (not shown). Central surface 1610 is approximately 30 µm wide and approximately 40 µm long, and is substantially centered on longitudinal axis 230. Ridge surfaces 1621-1624 are approximately 5 µm wide and approximately 30-40 µm long. Ridge surfaces 1622 and 1623 have lengthwise edges that are substantially parallel to longitudinal axis 203. Ridge surfaces 1621 and 1624 have lengthwise edges that are oblique to longitudinal axis 203 with trailing edges that angle toward central surface 1610. Raised ridge surfaces 1621-1624 and raised central surface 1610 all have surfaces 231 located approximately 10-30 nm above surface level 225 (not shown) of air bearing pads on an air bearing surface, such as ABS 200 of FIG. 2.

Raised features 1621-1624 and 1610 spread surface area of the touch pad 1630 and reduce stiction during contact between touch pad 1630 and a disk surface. Raised features 1621-1624 and 1610 also define recessed furrows (1641, 1642, 1643, and 1644). For instance furrow 1641 is defined between ridge 1621 and ridge 1622, and furrow 1642 is defined between ridge 1622 and central surface 1610. Raised features 1610 and 1621-1624 have surfaces at level 231, which protrudes above level 225 (FIG. 2). Furrows 1641-1644 are at a lower level, such as level 225, than surfaces 231. Furrows 1641-1644 are open ended, and the smallest end of any furrow is wide enough to allow a droplet of lubricant to flow into and completely through the furrow. This leads to a minimum furrow width of approximately 1-2 nm with currently utilized lubricants. This minimum width is important, because during contact between the disk surface and touch pad 1630, the flow in direction 204 is comprised of air and the viscous lubricant utilized on the disk surface.

By making features 1621-1624 and 1610 very long (relative to lubricant size) and substantially orienting them in the direction of flow 204, air flow and lubricant has to pass by the long edges of the features (1610 and 1621-1624). As the flow passes, negative pressure gradients are created along with meniscus bridging due to viscous interactions between the lubricant and the raised features 1610 and 1621-1624. Increased pitch two mode damping results from the pressure gradients and viscous interactions. The so-called 'coastline' rule applies, that is to say, the longer the 'coastlines' of the interacting features (1610 and 1621-1624) with the air/lubricant film, the more damping can be achieved thru viscous drag.

Pitch two mode damping is directly related to length of coastline of these raised features, especially ridges 1621-1624. Hence, longer coastlines typically result in higher damping. Thus longer raised ridge features 1621-1624 tend to increase viscous interactions leading to high pitch two mode damping. Adding more raised ridge surfaces and angling the oblique ridges (such as 1621 and 1624) slightly more towards the parallel ridges (1622 and 1623) also results in a slight increase in pitch two mode damping.

FIG. 17 is an exemplary touch pad configuration 1730 in accordance with one embodiment of the present invention. Touch pad 1730 operates in a similar fashion to touch pad 1630 (FIG. 16). Touch pad 1730 is comprised of a central raised surface 1710 and a plurality of raised ridge surfaces (1721, 1722, 1723, 1724, 1725, and 1726) disposed adjacent to central surface 1710. Ridge surfaces 1721-1726 extend in a lengthwise direction either parallel to or oblique to the direction 204 of flow across touch pad 1730 during disk contact.

Pitch one mode and roll mode axes (201, 203) intersect at point 250 on central surface 1710. Point 250 is the approximate location of the magnetic transducer head (not shown). Axis 203 also represents a longitudinal axis of an ABS, such as ABS 200 of FIG. 2. Central surface 1710 is approximately 30 µm wide and approximately 30 µm long, and is substantially centered on longitudinal axis 203. Ridges 1721-1726 are approximately 5 µm wide, approximately 80-100 µm long, and extend forward of the leading edge of central surface 1710. Ridges 1723 and 1724 have lengthwise edges that are substantially parallel to longitudinal axis 203. Ridges 1721-1722 and 1725-1726 have lengthwise edges that are oblige to longitudinal axis 204, with trailing edges that angle towards central surface 1710. Raised ridge surfaces 1721-

1726 and raised central surface 1710 all have surfaces 231 protruding approximately 10-30 nm above surface level 225 (not shown) of air bearing pads on an air bearing surface, such as ABS 200 of FIG. 2.

As in touch pad 1630, raised features 1721-1726 and 1710 spread surface area of touch pad 1730 and reduce stiction during contact between touch pad 1730 and a disk surface. Raised features 1721-1726 and 1710 also define recessed furrows (1741, 1742, 1743, 1744, 1745, and 1746). For instance furrow 1741 is defined between ridge 1721 and ridge 1722, and furrow 1743 is defined between ridge 1723 and central surface 1710. Furrows 1741-1746 are at a lower level, such as level 225, than surface 231. Furrows 1741-1746 are open ended, and the smallest end of any furrow is wide enough to allow a droplet of lubricant to flow into and completely through the furrow. This leads to a minimum furrow width of approximately 1-2 nm, based on currently utilized disk lubricants. This minimum width is important, because during contact between the disk surface and touch pad 1710, the flow in direction 204 is comprised of air and the viscous lubricant utilized on the disk surface.

FIG. 18 is an exemplary touch pad configuration 1830 in accordance with one embodiment of the present invention. Touch pad 1830 operates in a similar fashion to touch pad 1630 (FIG. 16) with the exception of having furrows that are closed on one end. Touch pad 1830 is comprised of a central raised surface 1810 and a plurality of raised ridge surfaces (1821, 1822, 1823, and 1824) disposed adjacent to central surface 1810. Ridges 1821-1824 are coupled to and extend forward from the leading edge of central surface 1810. Ridges 1821-1824 extend in a lengthwise direction either parallel to or oblique to the direction 204 of flow across touch pad 1830 during disk contact.

Pitch one mode and roll mode axes (201, 203) intersect at point 250 on central surface 1810. Axis 203 also represents a longitudinal axis of an ABS, such as ABS 200 of FIG. 2. Point 250 is the approximate location of the magnetic transducer head (not shown). Central surface 1810 is approximately 30 μm wide and approximately 60 μm long, and is substantially centered on longitudinal axis 203. Ridges 1821-1824 are approximately 5 μm wide. Ridges 1821 and 1824 are approximately 60-80 μm long, with lengthwise edges oblique to longitudinal axis 203, and trailing edges that angle towards central surface 1810. Ridge surfaces 1822 and 1823 are approximately 20-40 μm long, with lengthwise edges substantially parallel to longitudinal axis 203. Raised ridge surfaces 1821-1824 and raised central surface 1810 all have surfaces 231 protruding approximately 10-30 nm above surface level 225 (not shown) of air bearing pads on an air bearing surface, such as ABS 200 of FIG. 2.

As in touch pad 1630, raised features 1821-1824 and 1810 spread surface area of touch pad 1830 and reduce stiction during contact between touch pad 1830 and a disk surface. Raised features 1821-1826 and 1810 also define recessed furrows (1841, 1842, and 1843). For instance furrow 1841 is defined between ridge 1821, ridge 1822, and a portion of central surface 1810. Furrows 1841-1843 are at a lower level, such as level 225, than surface 231. Furrows 1841-1843 are closed on their trailing ends. This may lead to a build up of some debris and lubricant near the trailing edge of the furrows. However, if a touch pad 1830 is substantially burnished off, or only has intermittent disk contact this is not an issue. The leading edge of any furrow 1841-1843 in FIG. 18 is wide enough to allow a droplet of lubricant to flow into the furrow. This leads to a minimum furrow width of approximately 1-2 nm at the leading edge opening, based on presently utilized disk lubricants. This minimum width is important, because during contact between the disk surface and touch pad 1810, the flow in direction 204 is comprised of air and the viscous lubricant utilized on the disk surface.

Figure 19:
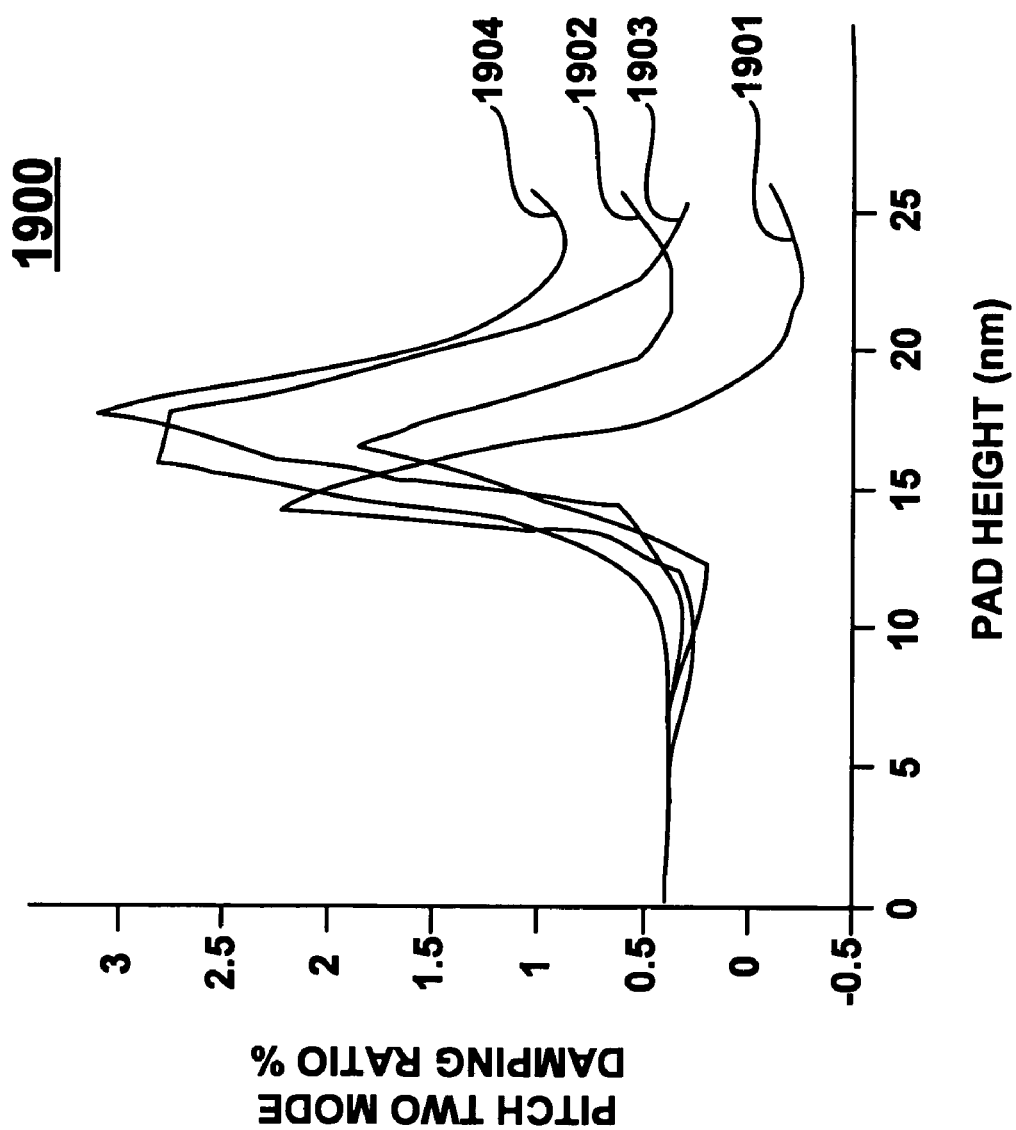
FIG. 19 is a graph of pitch two mode damping performance of exemplary touch pads, in accordance with various embodiments of the present invention.

FIG. 19 is a graph 1900 of pitch two mode damping performance of exemplary touch pads 230, 1630, 1730, and 1830 (FIGS. 2, 16, 17, and 18), in accordance with various embodiments of the present invention. Graph 1900 is read right to left, and shows the pitch two mode damping performance as touch pads 230, 1630, 1730, and 1830 are burnished down from approximately 27 nm to approximately 0.0 nm (which is equivalent to level 225 of FIG. 2). Touch pad 230 is exemplary of a protruding touch pad commonly in use. Line 1901 shows that touch pad 230 has negative pitch two damping until it is burnished down to approximately 15 nm. Line 1902 shows the performance of touch pad 1630, which exhibits positive pitch two damping throughout burnishing. Line 1903 shows the performance of touch pad 1730, which exhibits positive pitch two damping throughout burnishing, along with the best overall performance. Line 1904 shows the performance of touch pad 1930, which exhibits positive pitch two damping throughout burnishing.

The alternative embodiments of the present invention are thus described. While the present invention has been described in particular embodiments, it should be appreciated that the present invention should not be construed as limited by such embodiments, but rather construed according to the below claims.

What is claimed is:

1. A slider for a data storage device, said slider comprising:
an air bearing surface (ABS), said ABS comprising:
a trailing edge air bearing pad disposed along a central roll axis of said air bearing surface, said trailing edge air bearing pad formed separately from and disposed forward of a leading edge of a trailing edge touch pad that is also disposed along said central roll axis of said air bearing surface; and
at least one channel recessed within said trailing edge air bearing pad, wherein said at least one channel is formed with an open top, and wherein said at least one channel is located entirely within boundaries of said trailing edge air bearing pad, and wherein said at least one channel is configured to create pitch two mode damping of said slider during operation of said slider by forming a pressure gradient between an air bearing level of said slider and a bottom of said at least one channel.

2. The ABS of claim 1, wherein said at least one channel recessed within said at least one air bearing pad comprises:
a central channel, wherein said central channel comprises a leading edge and a trailing edge; and
a plurality of side channels, wherein said plurality of side channels is arranged around said central channel, and wherein trailing edges of each of said plurality of side channels couple to and converge into said central channel.

3. The ABS of claim 2, wherein said at least one channel recessed within said at least one air bearing pad further comprises:
a debris channel, said debris channel formed with a leading edge coupled to and diverging from said trailing edge of said central channel.

4. The ABS of claim 1, further comprising:
a touch pad, wherein said touch pad is situated at a trailing edge of said ABS;
a central surface of said touch pad, wherein said central surface is substantially centered on a longitudinal access of said ABS;

a plurality of ridge surfaces adjacent to said central surface, wherein each individual ridge surface of said plurality of ridge surfaces is disposed with a lengthwise edge either parallel to or oblique to said longitudinal axis of said ABS; and wherein said central surface and said ridge surfaces protrude above a surface level of a trailing edge air bearing pad.

5. The ABS of claim 4, wherein a separation between a portion of said central surface and at least one of said ridge surfaces defines a recessed furrow.

6. The ABS of claim 5, wherein said recessed furrow is of sufficient width to allow a droplet of lubricant to flow into said furrow.

7. The ABS of claim 1, wherein said at least one air bearing pad comprises:
at least one leading edge air bearing pad.

8. The ABS of claim 1, wherein said at least one air bearing pad comprises:
a trailing edge air bearing pad; and
at least one leading edge air bearing pad.

9. A data recording device comprising:
a disk with a data surface of concentric data tracks;
a rotator for rotating said disk about an axis generally perpendicular to said disk;
a slider maintained in operative relationship with said data surface when said disk is rotating, said slider having an air bearing surface (ABS), said ABS comprising:
a trailing edge air bearing pad disposed along a central roll axis of said air bearing surface, said trailing edge air bearing pad formed separately from and disposed forward of a leading edge of a trailing edge touch pad that is also disposed along said central roll axis of said air bearing surface; and
at least one channel recessed within said trailing edge air bearing pad, wherein said at least one channel is formed with an open top, and wherein said at least one channel is located entirely within boundaries of said air bearing pad, and wherein said at least one channel is configured to create pitch two mode damping of said slider during operation of said slider by forming a pressure gradient between an air bearing level of said slider and a bottom of said at least one channel;
a transducer attached to said slider for reading data from and writing data to said data surface; and
an actuator arm for moving said slider generally radially to said disk to allow said transducer to access said data tracks.

10. The data recording device of claim 9, wherein said at least one channel recessed within said at least one air bearing pad comprises:
a central channel, wherein said central channel comprises a leading edge and a trailing edge; and
a plurality of side channels, wherein said plurality of side channels is arranged around said central channel, and wherein trailing edges of each of said plurality of side channels couple to and converge into said central channel.

11. The data recording device of claim 10, wherein said at least one channel recessed within said at least one air bearing pad further comprises:
a debris channel, said debris channel formed with a leading edge coupled to and diverging from said trailing edge of said central channel.

12. The data recording device of claim 9, wherein said ABS further comprises:
a touch pad, wherein said touch pad is situated at a trailing edge of said ABS;
a central surface of said touch pad, wherein said central surface is substantially centered on a longitudinal access of said ABS;
a plurality of ridge surfaces adjacent to said central surface, wherein each individual ridge surface of said plurality of ridge surfaces is disposed with a lengthwise edge either parallel to or oblique to said longitudinal axis of said ABS; and
wherein said central surface and said ridge surfaces protrude above a surface level of a trailing edge air bearing pad.

13. The data recording device of claim 12, wherein a separation between a portion of said central surface and at least one of said ridge surfaces defines a recessed furrow.

14. The data recording device of claim 13, wherein said recessed furrow is of sufficient width to allow a droplet of lubricant to flow into said furrow.

15. The data recording device of claim 9, wherein said at least one air bearing pad comprises:
at least one leading edge air bearing pad.

16. The data recording device of claim 9, wherein said at least one air bearing pad comprises:
a trailing edge air bearing pad; and
at least one leading edge air bearing pad.

17. A head assembly for a data storage device, said head assembly comprising:
an air bearing surface (ABS), said ABS comprising:
a trailing edge air bearing pad disposed along a central roll axis of said air bearing surface, said trailing edge air bearing pad formed separately from and disposed forward of a leading edge of a trailing edge touch pad that is also disposed along said central roll axis of said air bearing surface; and
a means for defining at least one channel within said trailing edge air bearing pad, wherein said at least one channel is configured to create pitch two mode damping of a slider during operation of said head assembly by forming a pressure gradient between an air bearing level of said slider and a bottom of said at least one channel.

18. The ABS of claim 17 further comprising:
a touch pad at a trailing edge of said ABS, wherein said touch pad protrudes above a surface level of a trailing edge air bearing pad;
a means for defining a central surface of said touch pad; and
a means for defining a plurality of ridge surfaces of said touch pad.

* * * * *